US008811211B2

(12) United States Patent
Huschke et al.

(10) Patent No.: US 8,811,211 B2
(45) Date of Patent: Aug. 19, 2014

(54) MULTICAST SCHEDULING AND LINK ADAPTATION

(75) Inventors: Jörg Huschke, Aachen (DE); Mai-Anh Phan, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 284 days.

(21) Appl. No.: 13/388,844

(22) PCT Filed: Sep. 10, 2009

(86) PCT No.: PCT/EP2009/061778
§ 371 (c)(1),
(2), (4) Date: Apr. 11, 2012

(87) PCT Pub. No.: WO2011/015252
PCT Pub. Date: Feb. 10, 2011

(65) Prior Publication Data
US 2012/0188894 A1    Jul. 26, 2012

(30) Foreign Application Priority Data

Aug. 6, 2009   (WO) ................. PCT/EP2009/060211

(51) Int. Cl.
*G01R 31/08*   (2006.01)
*H04L 12/56*   (2006.01)
*H04W 72/12*   (2009.01)
*H04W 4/06*    (2009.01)
*H04L 1/00*    (2006.01)

(52) U.S. Cl.
CPC ............ *H04L 1/0002* (2013.01); *H04L 47/806* (2013.01); *H04W 72/1226* (2013.01); *H04W 4/06* (2013.01); *H04L 1/0026* (2013.01)
USPC .......................................... 370/252; 370/312

(58) Field of Classification Search
CPC ................................ H04W 4/06; H04W 24/00
See application file for complete search history.

(56) References Cited

U.S. PATENT DOCUMENTS

| 6,377,550 | B1 * | 4/2002 | Prasad ....................... 370/236.1 |
| 2003/0033425 | A1 | 2/2003 | Deshpande | |
| 2007/0115813 | A1 | 5/2007 | Hyon et al. | |
| 2008/0273458 | A1 * | 11/2008 | Guo et al. .................... 370/229 |
| 2012/0170683 | A1 * | 7/2012 | Frederiksen et al. ......... 375/308 |

FOREIGN PATENT DOCUMENTS

WO    2006121493   A1    11/2006

* cited by examiner

*Primary Examiner* — Ricky Ngo
*Assistant Examiner* — Iqbal Zaidi
(74) *Attorney, Agent, or Firm* — Coats & Bennett, PLLC

(57) ABSTRACT

The invention relates to a method for transmitting multicast information from at least one transmitter (BS, Tx) to a plurality of receivers ($UE_1$, $UE_2$, ... $UE_N$), comprising determining ($S_{10}$) a channel quality measure ($r_{u,s}$) of each receiver ($UE_1$, $UE_2$, ... $UE_N$), adapting (S60) transmission rates ($Ra_s$) of the transmitter (BS) to cause the transmitter (BS) to transmit at different rates ($Ra_s$) for different transmission resource units, particularly transmission time intervals (TTI), based on the channel quality measures ($r_{u,s}$) of the plurality of receivers ($UE_1$, $UE_2$, ... $UE_N$), assigning (S20, S30) a weight value ($w_{u,s}$) and a cumulative weight value ($wc_{u,s}$) to each receiver out of the plurality of receivers ($UE_1$, $UE_2$, ... $UE_N$), wherein at least for a subset out of the plurality of receivers ($UE_1$, $UE_2$, ... $UE_N$) said cumulative weight value ($WC_{u,s}$) is a function calculated by taking into account weight values of other receivers out of the plurality of receivers ($UE_1$, $UE_2$, ... $UE_N$), calculating (S40), for each receiver ($UE_1$, $UE_2$, ... $UE_N$), a weighted channel quality measure ($wr_{u,s}$) being a function of the respective cumulative weight value ($wc_{u,s}$) for this receiver ($UE_1$, $UE_2$, ... $UE_N$) and its channel quality measure ($r_{u,s}$), and adapting (S60) the transmission rate ($Ra_s$) such that it meets the channel quality ($r_{u,s}$) of the receiver having the maximum weighted channel quality measure ($wr_{uo,s}$). The invention further relates to a network access node (BS, AN), comprising a transmitter (BS, Tx) adapted to transmit multicast information to a plurality of receivers ($UE_1$, $UE_2$, ... $UE_N$), said transmitter (BS, Tx) being able to transmit at different transmission rates ($Ra_s$) for different transmission resource units, particularly transmission time intervals (TTI), means for determining a channel quality measure ($r_{u,s}$) for each of said plurality of receivers ($UE_1$, $UE_2$, ... $UE_N$) and a processor, said network access node (BS, AN) being adapted to perform the described method.

31 Claims, 12 Drawing Sheets

MULTICAST SCHEDULING AND LINK ADAPTATION

TECHNICAL FIELD

The present invention relates to a method for transmitting multicast information from at least one transmitter to a plurality of receivers, comprising determining channel quality information and/or effective rates of said plurality of receivers and adapting a transmission rate of the transmitter based on the channel quality information and/or effective rates of the plurality of receivers, and a network access node being adapted to perform said method.

BACKGROUND

Multicasting denominates a process in which one sender or transmitter sends the same message, respectively information content or data, to a plurality of receivers. In many cases, the message sent can technically be received by more receivers than the plurality of receivers addressed by the transmitter, particularly in radio-based telecommunication, which in principle is a broadcast medium. Multicasting is not limited to any particular transmission technology, but can be applied in any transmission system, e.g. for any kind of wireline or wireless technology. For mobile communication, multicasting has e.g. been generally described in 3GPP TS 26.346: Multimedia Broadcast/Multicast Service (MBMS); Protocols and codecs; Release 6 or in 3GPP TS 25.346: Introduction of the Multimedia Broadcast/Multicast Service (MBMS) in the Radio Access Network (RAN); Stage 2.

As a plurality of receivers takes part in the multicast transmission, the respective channel qualities may differ from each other. Such channel quality may be defined e.g. in terms of supported transmission rates, packet error rates, etc. This particularly applies—however not limited to this example— to mobile communication environments, in which different receivers (e.g. user terminals) experience different radio reception conditions, e.g. due to their distance to a transmitter (e.g. a base station), mountain effects, travel speed etc., resulting in different supported transmission rates of the different receivers. Additionally, the reception conditions, e.g. said supported transmission rates, may vary over time, e.g. due to changing environmental conditions or due to movement of receivers. This may, however, also apply to other kinds of transmission systems, e.g. IP-traffic, in which transmission data rates may be different or change due to access technologies (Ethernet, WLAN, etc.) and/or network load, which may be different for different receivers and/or vary over time.

For a multicast transmission, it is desirable and in some cases indispensable that all addressed receivers have, at the end of the transmission, obtained the complete message to be sent. If, however, the transmission data rate is adapted to the receiver having the least channel quality, possibly transmission resources are wasted or average data rate is kept at a lower level as necessary. The general goal is therefore to maximise the overall throughput in a multicast transmission, i.e. the ratio of the amount of transmitted data and the time or other resources needed until all receivers have received the data.

In some cases, e.g. mobile radio communication according to the LTE standard, transmission is slotted into transmission time intervals (TTI). The transmit rate can be chosen by the base station independently in each TTI based on the channel quality per user equipment, which is assumed to be known by the base station. The channel quality on the transmission link of user equipment (UE) u in TTI s can be expressed as the transmit rate $r_{u,s}$ that achieves a desired low reception failure probability (also known as block error probability, BLEP) at UE u. If in a certain TTI s the transmit rate $Ra_s$ used by the base station is smaller than or equal to a supported transmit rate $r_{u,s}$ of UE u ($Ra_s \leq r_{u,s}$), then it is assumed that $BLEP_u = 0$, and else $BLEP_u = 1$, i.e. in the latter case reception always fails. The appropriate choice of $Ra_s$ is also called link adaptation. Since the choice of $Ra_s$ for TTI s also determines which UEs will fail to receive in TTI s, the choice of $Ra_s$ can be interpreted as a scheduling decision, i.e. UEs that will fail to receive can be regarded as being not scheduled in TTI s.

Generally, the multicast throughput can be defined as the smallest throughput of all UEs, where the throughput per UE is the average over all TTIs, taking into account for each TTI either the $Ra_s$, if $Ra_s \geq r_{u,s}$ or else zero rate. Alternatively, the data packets effectively received by the user equipment may be evaluated.

A method and apparatus for opportunistic multicasting with coded scheduling in wireless networks is disclosed in WO 2008/079222 A1. According to this document, the multicast transmission uses error correction coding with code blocks covering a virtually infinite number of consecutive TTIs. The assumption is a code with the property that a UE can decode a code block if it can receive at least a fraction c, also called the code rate, of the encoded bits of the code block. Such codes are also known as error correction codes or erasure codes. This allows the base station to select a transmit rate Ra so that UEs fail to receive a fraction 1-c out of the encoded bits, accumulated over all TTIs in the code block. In the case of MBMS (Multimedia Broadcast/Multicast Service), such coding can be e.g. the application layer coding defined in 3GPP TS 26.346: Multimedia Broadcast/Multicast Service (MBMS); Protocols and codecs; Release 6.

The approach of the WO 2008/079222 A1 is to set in each TTI the transmit rate $Ra_s$ such that a certain number of L UEs can receive and the remaining N-L UEs fail to receive. Both iid (assuming that the supported transmit rates $r_u$ are independently and identically distributed) and non-iid rates $r_u$ are considered. For iid rates, in each TTI the UEs are sorted in the order of decreasing $r_{u,s}$ and the transmit rate $Ra_s$ is set equal to rate of the L-th element in the sorted list. L is said to be a fixed value for the iid case, and may be determined numerically or by simulation of the system for different channel statistics. In the non-iid case, a modification of a Proportional Fair Sharing (PFS) algorithm is used, taking into account the channel quality and the scheduling history for each user. Again, the problem may be numerically solved, when channel statistics are known a-priori, or else by means of a simulation, based on which L can be determined dynamically.

The mentioned solution presents only heuristic approaches to solve the problem of scheduling in a multicast environment, which can not be guaranteed to yield at least near to optimal results, particularly when the channel statistics are not known.

SUMMARY

The aim of the present invention is to provide a method and a network access node as initially mentioned, enabling scheduling decisions in terms of setting transmission rates that are suitable to improve the overall throughput in a multicast transmission.

This problem is solved by a method for transmitting multicast information from at least one transmitter to a plurality of receivers, comprising determining, for at least two receivers, effective rates as a function of a transmission rate to be set by the transmitter, calculating a combined function of effective rates of the at least two receivers, determining the argument of a maximum of said combined function and setting the transmission rate of the receiver to said argument. Of course, the method may performed by taking into account a plurality of more than two receivers, e.g. all receivers taking part in a multicast transmission.

By this method, the effective rates of some or all receivers taking part in a multicast transmission, said effective rates being a function of the transmission rate set or used by the transmitter, are taken into account when setting the transmission rate of the transmitter. Therefore, this transmission rate may be set in an advantageous manner.

The method may further comprise assigning a weight value to each of the at least two receivers and calculating the combined function as a weighted sum of the effective rates, e.g. as a linear combination of the effective rates, each effective rate being multiplied with the respective weight value.

The method may further comprise determining a channel quality measure, which may comprise a supported transmission rate, for each of said at least two receivers, wherein said effective rate is determined based on said channel quality measure.

The above problem is further solved by a method for transmitting multicast information from at least one transmitter to a plurality of receivers, comprising determining a channel quality measure of each receiver, assigning a weight value to at least one receiver and a cumulative weight value to each receiver out of the plurality of receivers, wherein at least for a subset out of the plurality of receivers said cumulative weight value is a function calculated by taking into account weight values of at least one other receiver out of the plurality of receivers, calculating, for each receiver, a weighted channel quality measure being a function of the respective cumulative weight value for this receiver and its channel quality measure, and adapting a transmission rate such that it meets the channel quality of the receiver having the maximum weighted channel quality measure.

In this method, it may be provided that a weight value is assigned to each receiver out of the plurality of receivers. Particularly, the cumulative weight value of each receiver may be calculated by taking into account the weight values of all receivers having a better channel quality, e.g. by adding up the weight values of all receivers having a better channel quality.

By the usage of the cumulative weight value, for each receiver not only its own weight is taken into account when making scheduling decisions, but also the weight of other receivers, for example of some or all receivers having a better channel quality. Therefore, a scheduling decision in favour of a particular receiver is made based on the cognition that such a scheduling decision may also favour further receivers and disadvantage other receivers. As the overall throughput is in the end determined by all receivers, with the proposed method the influence of a certain scheduling decision on the overall throughput is taken into account.

The channel quality measure may comprise a supported transmission rate of a receiver. In this case, the weighted channel quality measure may be calculated by multiplying the supported transmission rate with the cumulative weight value.

In any case, the transmission rate of the transmitter may be set to cause the transmitter to transmit at different rates for different transmission resource units.

The mentioned transmission resource units may be of any type of a dividable resource of a transmission channel, particularly units of a time resource like time steps or time slots or transmission time intervals, or frequency resource units, e.g. different carriers or sub-bands in a FDMA (frequency division multiple access) system, or code resource units, e.g. a certain code or set of codes, in a CDMA (code division multiple access) system.

When weight values are used, they may be calculated such that a minimum of throughputs of the plurality of receivers is maximised.

This may be achieved by maximising the minimum expectation value of throughputs of the plurality of receivers.

Generally, throughputs may be calculated by averaging over several transmission resource units, e.g. transmission time intervals.

The weight values may be set the higher, the lower the throughput of a receiver is. For example, the weight values may be set such that for each pair of receivers, the weight value of the receiver having the higher throughput is smaller, preferably much smaller, than the weight value of the receiver having the lower throughput, and/or that, for all receivers, the derivative of the weight value of a receiver with respect to its throughput is negative.

The relation of the weight value of a receiver having a higher throughput to the weight value of a receiver having a lower throughput preferably decreases strongly, approaching zero, with increasing difference or ratio between the higher and the lower throughput. Particularly, the ratio of the weight value of the receiver having the higher throughput and the weight value of the receiver having the lower throughput may be a function of the ratio of the lower throughput and the higher throughput.

According to one embodiment, the weight values may be calculated by a method comprising the steps of calculating, for each receiver, a relation of the throughput of the receiver to the maximum throughput of all receivers, calculating, for each receiver, a logarithm, preferably a natural logarithm, of said relation, raising the negative of said logarithm to the power of a predetermined parameter, and dividing the resulting value by the relation of the throughput of the receiver to the maximum throughput of all receivers.

Said predetermined parameter may be set to be a number greater, preferably much greater, than Zero. In this case, the greater the parameter gets, particularly when approaching infinity, the closer one comes to equalizing the throughputs of all receivers. When said predetermined parameter is set to Zero, the transmission rate complies with a proportional fair rule.

According to another embodiment, calculation of the weight values may comprise the steps of setting all weight values to predetermined initial values, determining a throughput for each receiver, determining the minimum throughput of all receivers, increasing the weight value of the receiver having the minimum throughput and repeating the previous steps until the minimum throughput converges.

The method may be performed for each transmission resource unit. Particularly, if the transmission resource is a time resource, the method may be performed at different time steps, e.g. at predetermined times, for example for each transmission time interval. Further, it may be performed in a network access node of a wireless network.

The aforementioned problem is further solved by a network access node, comprising a transmitter adapted to transmit multicast information to a plurality of receivers, said transmitter being able to transmit at different transmission rates, a quality estimator for determining a channel quality measure for each of said plurality of receivers and a processor comprising a weight adaptor being adapted to assign a weight value to at least one receiver and a cumulative weight value to each receiver out of the plurality of receivers, said network access node being adapted to perform the above method. Said network access node may be an access node to a wireless network.

The aforementioned problem is further solved by a network access node, comprising a transmitter adapted to transmit multicast information to a plurality of receivers, said transmitter being able to transmit at different transmission rates, a processor comprising a transmission rate estimator being adapted to determine effective rates of at least two receivers, calculate a combined function of effective rates of the at least two receivers and determine the argument of a maximum of said combined function, said network access node being adapted to perform the above method. This network access node may further comprise a processor comprising a weight adaptor being adapted to assign a weight value to each of the at least two receivers, and/or a quality estimator for determining a channel quality measure for each of the at least two receivers.

If any of the mentioned network access nodes comprises a quality estimator, said network access node may further comprise a receiver adapted to receive channel quality information from said plurality of receivers, wherein said quality estimator is adapted to determine said channel quality measure from said received channel quality information.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
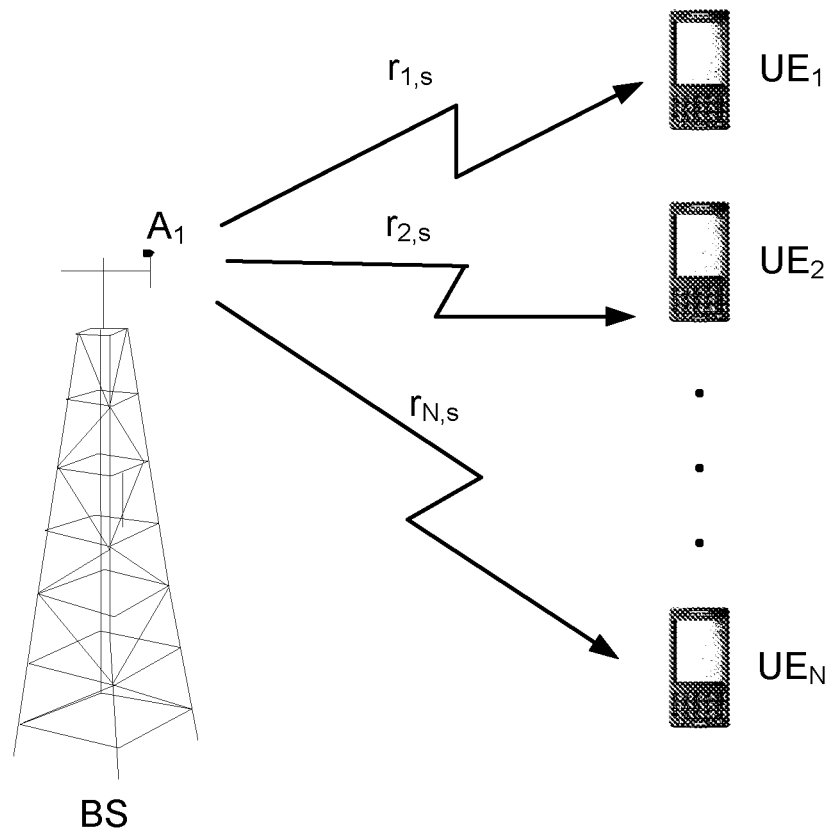
FIG. 1 shows a multicast transmission environment in wireless telecommunications.

FIG. 1 shows an exemplary multicast transmission environment in wireless telecommunications. A base station BS, acting as or comprising a transmitter of a multicast message, sends a multicast message, not shown, to a plurality of user terminals or user equipments $UE_1 \ldots UE_N$ acting as receivers of the multicast message. This exemplary base station BS may be considered as constituting, comprising or being comprised by the aforementioned network access node. It is understood that the message does not necessarily originate from the transmitter described herein but may come from a source or sender different from said transmitter. In such a case, the described method may be applied to one or more parts of the whole transmission chain only.

Base station BS comprises or is connected to at least one exemplary antenna $A_1$, over which electromagnetic signals can be transmitted. This antenna $A_1$ may also be capable of receiving electromagnetic signals, or a further antenna may be provided in or for base station BS for this purpose. Further, base station BS comprises circuitry for generating electromagnetic signals to be transmitted, and may comprise according circuitry for sensing electromagnetic signals to be received, and also comprises means for at least basic processing of those signals, e.g. modulating/demodulating, filtering, encoding/decoding etc. Said means may comprise hardware structures, e.g. one or more processing elements like microprocessors, e.g. general-purpose processors and/or (digital) signal processors, and/or dedicated hard-wired circuitry, as well as software functions being executed thereon. The reproduction of these elements has been omitted in the figure for sake of clarity. Of course, each user terminal $UE_1 \ldots UE_N$ also comprises an antenna and according circuitry, processing means etc.

Base station BS may be any type of radio network access node, e.g. a NodeB/eNodeB in UMTS/LTE radio systems. Accordingly, user terminals $UE_1 \ldots UE_N$ may comprise any type of user equipment adapted to use mobile communication, e.g. mobile phones, smartphones, PDAs, portable computers of any type being equipped with according communication means etc.

However, the method and apparatus described herein are not limited to this technology, but may also comprise other types of wireless connections, like WLAN, WiMAX, Bluetooth etc., or wireline connections like Ethernet LANs, DSL, ATM and the like.

Between base station BS and user terminals $UE_1 \ldots UE_N$ at least a downlink radio connection (i.e. from base station BS to the user terminals $UE_1 \ldots UE_N$) exists, which may be complemented by an according uplink connection (from all or some of user terminals $UE_1 \ldots UE_N$ to base station BS, not shown). The channel quality of each of these downlink connections is indicated by a supported transmission rate $r_{u,s}$ for each user terminal UE u, $(r_{1,s} \ldots r_{N,s}$ for user terminals $UE_1 \ldots UE_N)$ which may vary for each transmission time interval (TTI) s. These supported transmission rates $r_{u,s}$ may be known or estimated respectively determined prior to or during a transmission, and may be derived or determined e.g. by channel statistics or from measurements or according signalling. For example, when a user terminal UE u sends acknowledgements for received (and successfully decoded) data packets, from these acknowledgements the base station BS can deduce a channel quality measure $r_{u,s}$. As another example, e.g. in LTE, a parameter (Channel Quality Indicator, CQI) in a report transmitted from the UE to the base station may be used for downlink channel quality reporting and thus determining a channel quality measure $r_{u,s}$ for each UE.

Figure 2:
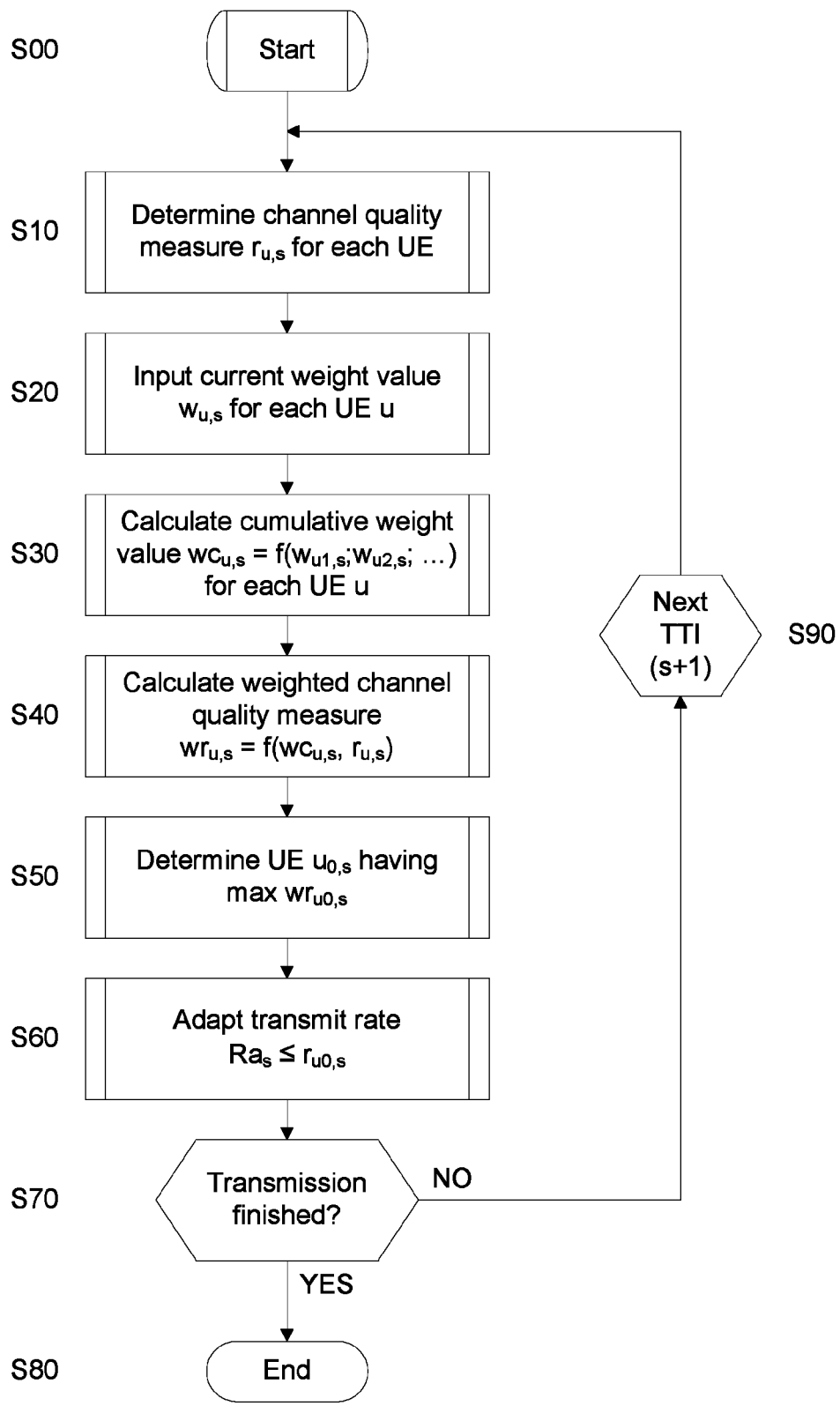
FIG. 2 is a flowchart showing determining of the transmit rate.

FIG. 2 shows a flowchart of a method for determining the transmission rate used by a transmitter taking into account channel quality measures and weight values of receivers of a multicast message. This method may be employed in a multicast environment as described with reference to FIG. 1, wherein the method may be executed in base station BS when sending a multicast message to user terminals UE u having supported transmission rates $r_{u,s}$. Of course, supported transmission rates $r_{u,s}$ are only one example of a channel quality measure, and many other types of channel quality measures known to or findable by a person skilled in the art may be employed. Such channel quality measures may e.g. be determined by the above-mentioned methods.

According to the method depicted in FIG. 2, in step S00 execution is started. In step S10, the channel quality measure for each UE is determined, e.g. the supported transmission rates $r_{u,s}$ of each user terminal UE. Then, in step S20 the current weight values $w_{u,s}$ are input, e.g. from a calculation routine described further below, from an earlier calculation, or as being predetermined values. The aforementioned step of assigning weight values to each receiver may be accomplished by this input step, particularly when the weight values $w_{u,s}$ are calculated for the first time or are re-calculated. It is however also conceivable that the step of assigning weight values has taken place at an earlier time, in which case the already assigned weight values may be used as input, if no need for a recalculation arises.

In step S30, the cumulative weight values $wc_{u,s}$ for each user terminal UE u are calculated, wherein the cumulative weight values $wc_{u,s}$ are calculated as a function of the weight values $w_{u,s}$ of other user terminals UE, potentially of all user terminals UE or of a subset thereof. The function for calculation of the cumulative weight values $wc_{u,s}$ may be any arbitrary function, e.g. a sum, a linear combination or any other combination of the weight values $w_{u,s}$ of other user terminals UE. According to one example, the cumulative weight values $wc_{u,s}$ are calculated as a function of the weight values $w_{u,s}$ of some or all other user terminals UE having a better channel quality, e.g. higher supported transmission rates $r_{u,s}$.

Subsequently, in step S40, a weighted channel quality measure $wr_{u,s}$ of each user terminal UE is calculated as a function of its channel quality measure $r_{u,s}$ (e.g. supported transmission rate) and its cumulative weight values $wc_{u,s}$. This function may be any arbitrary function, for example a product of the two values $wc_{u,s}$ and $r_{u,s}$, or any other combination thereof.

Based on this weighted channel quality measure $wr_{u,s}$, in step S50 the user terminal(s) UE fulfilling certain criteria is/are determined, e.g. the user terminal(s) whose weighted channel quality measure $wr_{u,s}$ is above a predetermined or dynamically determined threshold value, or the user terminal $u_{0,s}$ having the maximum weighted channel quality measure (in this example, the weighted supported transmission rate) $wr_{u0,s}$. In a case where more than one user terminal fulfils the mentioned criteria, e.g. the weighted channel quality measure $wr_{u,s}$ is above said threshold, or when two or more user terminals have the same maximum weighted channel quality measure $wr_{u0,s}$, a further selection step will have to be done, as these user terminals may have different supported transmission rates. It may e.g. be provided that in such cases the user terminal having the highest, the lowest, or a randomly selected supported transmission rate is selected.

According to the selection made in step S50, in step S60 the transmit rate $Ra_s$ is adapted to the channel quality of the selected user terminal, e.g. to the supported transmission rate $r_{u0,s}$ of user terminal $u_{0,s}$ having the maximum weighted supported transmission rate $wr_{u0,s}$. This adaptation should normally be such that the transmit rate $Ra_s$ is set equal to the to the supported transmission rate $r_{u0,s}$ of selected user terminal $u_{0,s}$, however under certain circumstances it may be set to a smaller value, e.g. when the transmit rate $Ra_s$ can only be adapted in discrete steps and the supported transmission rate $r_{u0,s}$ does not coincide with such a discrete step.

An intuitive motivation for this method is the following consideration: If the transmit rate $Ra_s$ is set to the supported rate $r_{u0,s}$ of user u0, then the data block sent in this TTI s will also be received by all other user terminals $U_i$ with $r_{Ui,s} \geq r_{u0,s}$, and therefore also the weights for these user terminals need to be considered.

Indices s with the aforementioned values indicate that these values are valid or determined for a certain time, time step or time slot, e.g. a transmission time interval (TTI) s. Therefore, the described method may be executed for each time step/ time slot, or every predetermined number of time steps/time slots, until the multicast message is completely transmitted (or even after transmission is finished).

Accordingly, in step S70 a decision is made whether the transmission is finished; if this is the case, the method terminates in step S80. If transmission is not finished, the method returns to step S10 for the next time step/time slot, in the present example for the next TTI, via step S90.

Figure 6A:
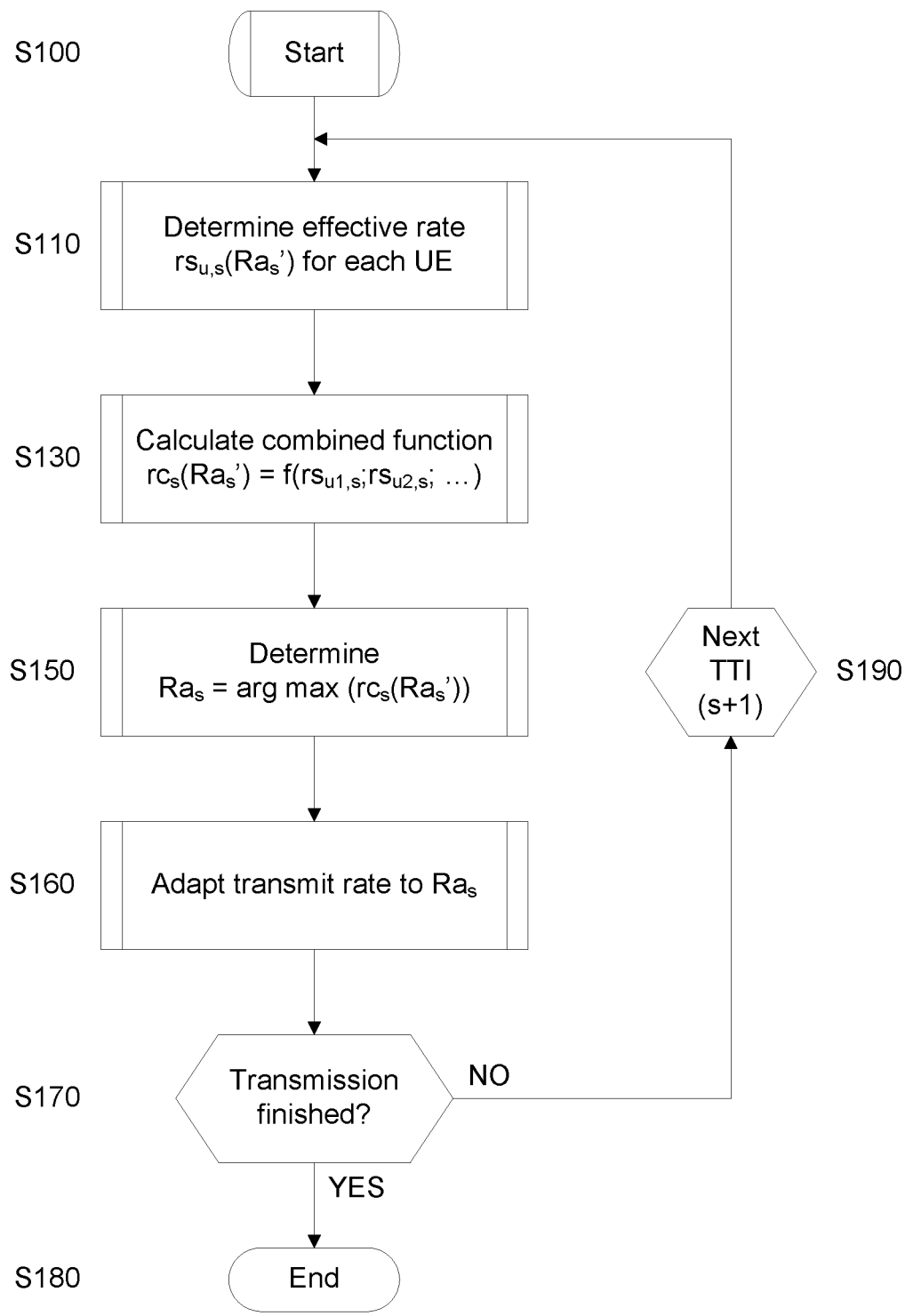
FIGS. 6a and 6b are flowcharts showing an alternative to the determining of the transmit rate in FIG. 2.
Figure 6B:
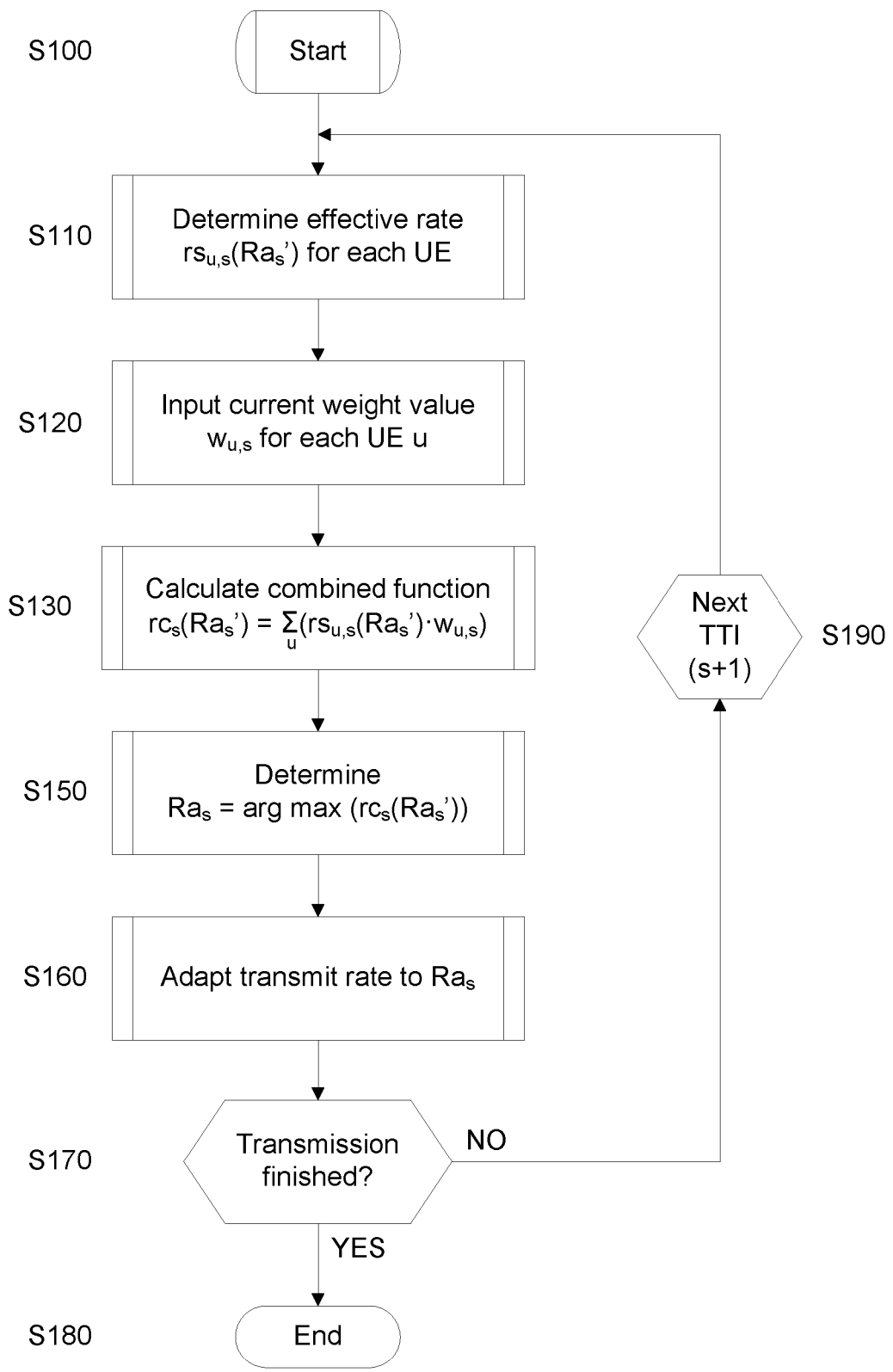

FIGS. 6a and 6b are flowcharts of alternative methods to the method of FIG. 2. Method steps that are common to or alike in both FIGS. 6a and 6b are denoted with the same identifiers. Again, these methods may be employed in a multicast environment as described with reference to FIG. 1, wherein the method may be executed in base station BS when sending a multicast message to user terminals UE u of at least some of which effective rates can be determined.

After start in step S100, effective rates $rs_{u,s}$ of the user terminals UE are determined in step S110. This step may be performed in any suitable manner known to a person skilled in the art, particularly by the methods described herein further below. Note that these effective rates $rs_{u,s}$ are, in this case, a function of a transmit rate $Ra_s'$.

In step S130 of the method of FIG. 6a, a combined function of the effective rates $rs_{u,s}$ of all involved user terminals UE is calculated. This function may be any arbitrary function, e.g. a weighted sum of the effective rates $rs_{u,s}$.

For example, in the method shown in FIG. 6b, in step S120 following step S110, current weight values $w_{u,s}$ are input similar to step S20 of FIG. 2, e.g. from a calculation routine described further below, from an earlier calculation, or as being predetermined values. Again, the aforementioned step of assigning weight values to each receiver may be accomplished by this input step, particularly when the weight values $w_{u,s}$ are calculated for the first time or are re-calculated. It is however also conceivable that the step of assigning weight values has taken place at an earlier time, in which case the already assigned weight values may be used as input, if no need for a recalculation arises.

Subsequent to the input of weight values $w_{u,s}$ in step S120, in step S130 of FIG. 6b the combined function is calculated as a weighted sum of the effective rates $rs_{u,s}$, weighted with the weight values $w_{u,s}$, over all involved user terminals In step S150 of FIGS. 6a and 6b, the argument $Ra_s$ of a maximum of the combined function is determined, and in step S160 the transmit rate of the transmitter is set to this argument $Ra_s$.

Therefore, in the method of FIG. 6b, the transmit rate $Ra_s$ of the transmitter is obtained according to the formula $$Ra_s = \underset{Ra_s'}{\operatorname{argmax}} \left( \sum_{u=1}^{N_u} rs_{u,s}(Ra_s') \cdot w_u \right),$$

wherein $Ra_s$ is a transmit rate of the transmitter, $rs_{u,s}$ are effective rates of the user terminals as functions of a transmit rate variable $Ra_s'$, $w_u$ are weight values assigned to the user terminals, and $N_u$ is the number of terminals to be considered, e.g. the number of terminals taking part in the multicast transmission.

Note that the combined function may have more than one local maximum, i.e. two or more values for the arg max may be obtained, from which one has to be chosen. In order to select the optimum transmit rate $Ra_s$, the global maximum or a maximum that comes at least close to the global maximum may be chosen. It may in some cases, e.g. when there is no exact knowledge regarding the channel quality or effective rates of the user terminals, be considered to choose a local maximum whose argument is the highest of all maxima, even if this particular maximum is not a global maximum. Thereby, it can be accounted for possible uncertainties in the calculation of the combined function, e.g. due to errors or uncertainties in determining the effective rates, outdated channel quality reports of some user terminals etc. Such errors or uncertainties may for example be introduced by the use of a probability measure like the BLEP in determining the effective rates.

Similar to the method of FIG. 2, in step S170 a decision is made whether the transmission is finished; if this is the case, the method terminates in step S180. If transmission is not finished, the method returns to step S110 for the next time step/time slot, in the present example for the next TTI, via step S190.

With this method, a transmit rate $Ra_s$ for the transmitter is obtained that maximises the overall throughput in a multicast transmission.

The following considerations are generally valid as well for the method of FIG. 2 as for the methods of FIGS. 6a and 6b.

Although in most cases the index s will denote a time resource like e.g. a transmission time interval as defined in the LTE standard, also different interpretations are possible, i.e. any dividable resource of a transmission channel may be addressed. For example, s may also denote a frequency resource, e.g. different carriers or sub-bands in a FDMA (frequency division multiple access) system, or a code resource, e.g. a certain code or set of codes, in a CDMA (code division multiple access) system. It is even conceivable that different transmission resources (time, frequency) are addressed in combination or in parallel.

It is appreciated that in the present examples the described methods are repeatedly performed for consecutive time steps/time slots or transmission time intervals (TTI). It is, however, conceivable that the respective method is only performed at certain points in time, e.g. at predetermined times, every predetermined number of time steps/time slots, or triggered by internal or external events, such as a signalling from one or more user terminals regarding a change in conditions, e.g. experienced channel quality or field strength, or only once before or with the start of transmission of a multicast message.

It is further conceivable that only step S10 of determining channel quality information of the user terminals resp. step S110 of determining effective rates is performed repeatedly, and that the consecutive steps S20 to S60 resp. S120/S130 to S160 are only performed when the thus determined channel quality information resp. effective rate has changed to a certain extent and/or for a certain number of user terminals. For determining such changes that make a recalculation of the weight values accompanied by a possible adaptation of the transmit rate necessary, a person skilled in the art will easily find appropriate measures, e.g. by setting threshold values based on simulations or experiments.

It is further conceivable that, in the methods of FIGS. 2 and 6b, the weight values $w_{u,s}$ are fixed, at least for a certain period of time, and that the procedure described with respect to FIGS. 2 and 6b may be repeatedly performed with merely inputting these fixed weight values $w_{u,s}$ in step S20 resp. S120. Such an approach may e.g. be used when the weight values $w_{u,s}$ are predetermined or are the result of a preceding optimisation algorithm, as described further below. In such a case, the weight values $w_{u,s}$ may be kept constant during transmission of a multicast message, or may be recalculated only if transmission conditions change to a certain extent as described above.

For obtaining optimum or at least close to optimum results, the actual method of calculation of the weight values that are to be input in step S20 resp. S120 is of importance. A first and simple approach would be to assign equal weights to all user terminals, while it would be preferable to assign higher weights to user terminals having a lower channel quality, e.g. a supported transmission rate, or have been scheduled not so often in the past in order to have those scheduled more often. As mentioned before, it is generally desirable to achieve an equal average bitrate for all receivers, i.e. that the throughput of all receivers is to be equalized.

In the following, different methods of calculating the weight values are presented. If the weight values are not set to a fixed value a priori, in many cases the throughput $R_{u,s}$ of each user terminal may be used as a basis for their calculation. This throughput $R_{u,s}$, again, may be determined by different methods. One exemplary set of methods is described in the following with reference to FIGS. 3a and 3b. Method steps that are the same in both FIGS. 3a and 3b are denoted with the same reference signs and are explained in common.

After the start of the procedure for determining the throughput in step ST00, the transmit rate $Ra_s$ is set or obtained in step ST10. If transmission has not started yet, in some cases the transmit rate $Ra_s$ may not have been set or determined yet and may thus be set to an initial value, which may be arbitrary, e.g. the maximum, minimum or a randomly selected supported transmission rate $r_{u,s}$ of one of the user terminals taking part in the multicast transmission. The transmit rate $Ra_s$ may also be set to a value determined in a simulation or based on channel statistics. If the transmit rate $Ra_s$ has already been determined, e.g. in an earlier cycle or in the last TTI according to the methods of FIG. 2 (cf. step S60) or FIG. 6b (cf. step S160), this value is obtained and input to the procedure of FIG. 3a or 3b. It is appreciated that, if determination of the throughput $R_{u,s}$ is based on different time steps or time slots (TTIs) s, for each of those or for different groups of those, different transmit rates $Ra_s$ may be obtained, resulting in a set of transmit rates $Ra_s$.

Based on the transmit rate(s) determined in step ST10, the effective rate(s) $rs_{u,s}$ of each user terminal is/are determined in step ST20, potentially again for different time steps/time slots. The effective rate $rs_{u,s}$ of a user terminal given the selected transmit rate $Ra_s$ is equal to the amount of information bits that the user terminal can decode in TTI s divided by the duration of TTI s.

Figure 3A:
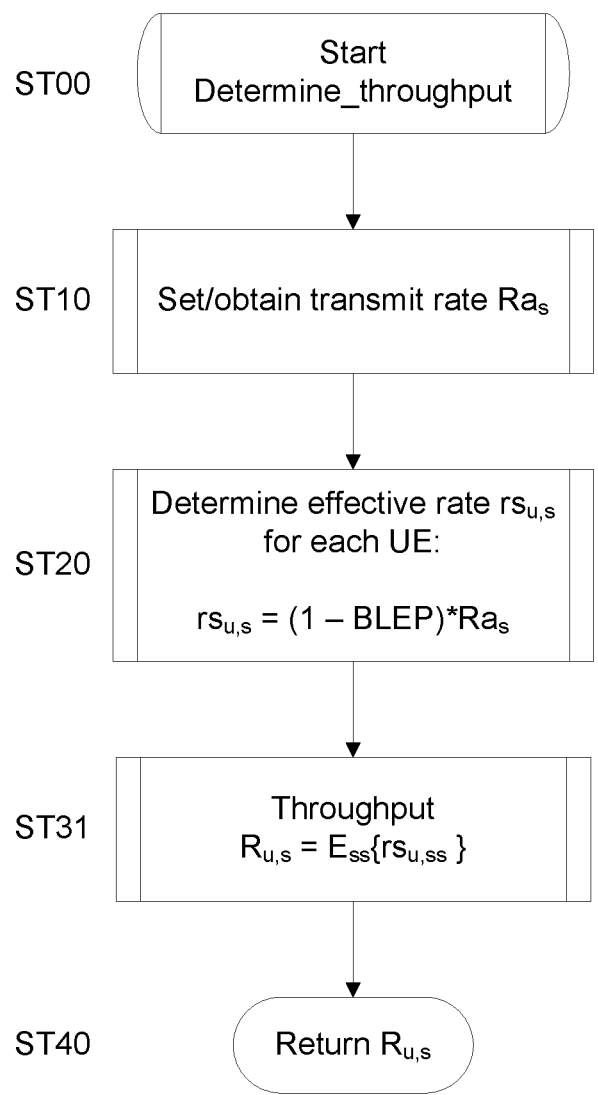
FIGS. 3a and 3b are flowcharts showing examples of determination of the throughput of a user terminal.
Figure 3B:
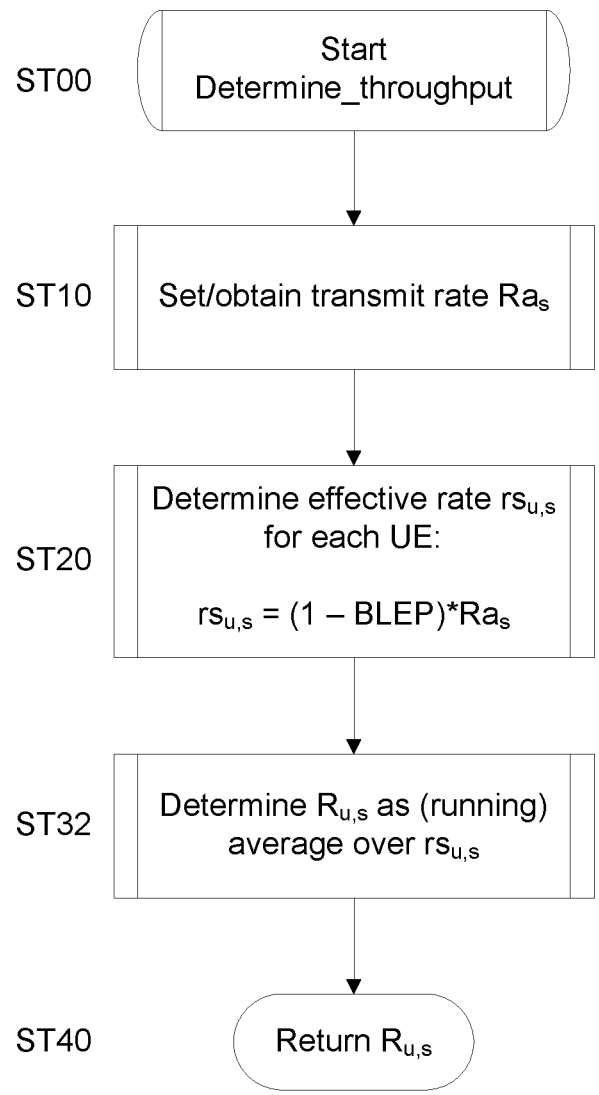

In step ST20 of FIGS. 3a and 3b, one possibility of determining the effective rates (e.g. for the method of FIGS. 6a and 6b) is shown, namely that the effective rate $rs_{u,s}$ of a user terminal at a certain time step or time slot (TTI) is determined by multiplying the transmit rate $Ra_s$ with (1-BLEP), thus yielding a probability-weighted effective rate taking into account the probability for a user terminal to successfully receive and decode a certain data block. This is based on the fact that the BLEP (Block Error Probability) will only in rare cases be reduced to the values of 0 and 1 as outlined in the introductory part. In reality, even a user terminal having a supported rate smaller than the transmit rate has a certain probability of receiving and successfully decoding a data block, and a user terminal having a supported rate above the transmit rate has a certain probability of failing to receive and successfully decode a data block.

As can be seen, if BLEP values of only 0 and 1 are assumed for the cases $rs_{u,s} > Ra_s$ and $rs_{u,s} < Ra_s$, respectively, this method yields the same results as the aforementioned scheduling decision: In this case, the effective rate $rs_{u,s}$ of a user terminal is equal to the selected transmit rate $Ra_s$ if the selected transmit rate $Ra_s$ is smaller than or equal to its supported rate $r_{u,s}$, and is Zero if this is not the case.

It is noted that the BLEP is in any case a value which may be dependent on the transmit rate $Ra_s$ and may be different for each user terminal.

There are, however, different possibilities of determining the effective rates that may be employed in step ST20 of the procedure of FIGS. 3a and 3b.

Another possibility would be to determine the effective rate of a user terminal based on its actual reception, e.g. by evaluating positive acknowledgements, in order to determine the number of packets per time unit that could effectively be successfully received and decoded.

As a further alternative, future values of the effective rates $r_{u,s}$ may be predicted, e.g. based on past values and/or probability measures. For example, for a certain user terminal, changes of the effective or supported rates over a certain time interval, e.g. due to mobility of a user terminal, may be used to obtain estimates for future rates. In order to do this, a person skilled in the art will be able to identify suitable prediction algorithms from his or her general knowledge.

In steps ST31 (FIG. 3a) respectively ST32 (FIG. 3b), the throughputs are determined, for which again different algorithms can be employed.

According to the alternative shown in FIG. 3a, the throughput $R_{u,s}$ is defined as the expectation value $E_{ss}\{rs_{u,ss}\}$ of the effective rate(s) $rs_{u,ss}$ of user terminal u over a number $N_s$ of TTIs ss in step ST31.

Ideally each user terminal (UE) shall receive the same amount of information out of a transmitted data block, for example an erasure code block. The goal is therefore to maximise the minimum of the per-UE information received accumulated over all resources s that are used to transmit the data block. An equivalent goal is to maximise the minimum per-UE throughput $R_{u,C}$ defined as the per-UE received information divided by the time interval required to transmit a data block C. The per-UE received information depends on the selected rates $Ra_s$ and on the supported rates $r_{u,s}$. However, at some scheduling instant t not all $r_{u,s}$ are known yet by the scheduler in the base station.

One solution is to assume that the statistical distribution of the unknown future $r_{u,s}$ is similar to that of the known past $r_{u,s}$ relating e.g. to resources used for the previous data block. Based on this assumption the throughput in the next data block can be estimated using the expectation of the effective rates $rs_{u,ss}$ in the previous code block.

According to the alternative shown in FIG. 3b, averages may be used in step ST32. The throughput $R_{u,s}$ may accordingly be defined as a running average of the effective rate $rs_{u,s}$ for each user terminal. The base station BS may keep $R_{u,s}$ updated. The averaging may use finite or infinite impulse response filter (FIR; IIR), e.g. moving window with equal weights of all samples in the window or a first order IIR filter.

Instead of a running average, the averaging may also be done in consecutive blocks of TTIs. Further, a weighted average may be employed, e.g. by giving effective rate(s) $rs_{u,s}$ that are further back in time a lower value. All types of effective rate calculations as described above may be used as input for averaging, and also combinations thereof. For example, effective rates of a number time steps/slots in the past may be calculated based on one of the methods presented above, and effective rates of a further number of time steps/slots in the future may be estimated, and any kind of averaging may be done over the effective rates for those time steps/slots, thus combining past knowledge and future estimates.

In step ST40, the throughput $R_{u,s}$ is returned and the method terminates.

It is conceivable that, in both alternatives, step ST10 may involve executing the method of FIG. 2 for all TTIs (or, more generally, transmission resource units) s considered in the expectation value in ST31 (FIG. 3a) or in the averaging of ST32 (FIG. 3b). It is noted that when the method of FIG. 2 is executed as part of ST10 the transmit rates $Ra_s$ are generally not directly applied for the data transmission, but merely as input into ST10.

Particularly when s denotes a resource unit different from a time unit, like a frequency unit, it may be preferred that the throughput $R_u$ is calculated not or not only for a certain unit s, but by a method that involves several or all units (e.g. carriers or sub-bands) used in the transmission, and is as such not necessarily to be indexed with s. When s, however, denotes a time resource like a transmission time interval, the throughput $R_{u,s}$ will in many cases be updated frequently, particularly when the transmit rate $Ra_s$ is dynamically adapted during transmission, and is thus time-dependent and may be indexed with s. Of course, even when s is a time resource, the throughput may be not time-dependent, particularly when a throughput $R_u$ is calculated for a transmission as a whole, for example when using expectation values according to step ST31 of FIG. 3a.

It is of course also conceivable that the throughput may be determined or estimated by further different methods, which do not necessarily involve a calculation of effective rates as described above. If, for example, acknowledgements for received and successfully decoded data blocks are given by the receivers (user terminals), a throughput may be determined based on the number of acknowledged data blocks per time unit.

As has been mentioned before, it is desirable to maximise the minimum throughput, and/or to equalise the throughputs of all user terminals taking part in a multicast transmission. A standard optimisation algorithm may be applied based on $R_{u,s}$ with the goal to equalise all $R_{u,s}$ or to maximise the minimum $R_{u,s}$. Different algorithms may result in different dynamic behaviour, e.g. different speed of convergence to and different amplitude of oscillation around the optimal multicast rate. A person skilled in the art will be able to select appropriate algorithms above the ones proposed herein based on his or her general knowledge.

One simple algorithm would only add a small constant value to the weight of the user with the minimum $R_{u,s}$ after every weight update interval. This method continuously tries to increase the throughput of the user terminal that currently has the smallest throughput of all user terminals and thereby inherently strives to equal throughputs for all user terminals. This approach may lead to weights that increase above all bounds over time. Therefore, all weights need to be scaled down by the same factor to suitable values, where the smallest weight has still a sufficient precision. The downscaling can be done e.g. after every weight update or once a weight hits the admissible range of the data type used for this variable in the computer implementation of the algorithm. As can seen from the above, the transmit rate selection algorithms of FIGS. 2 and 6b are invariant to scaling of the weights.

Further examples for methods of calculating the weight values are given in the following with reference to FIGS. 4 and 5.

Figure 4:
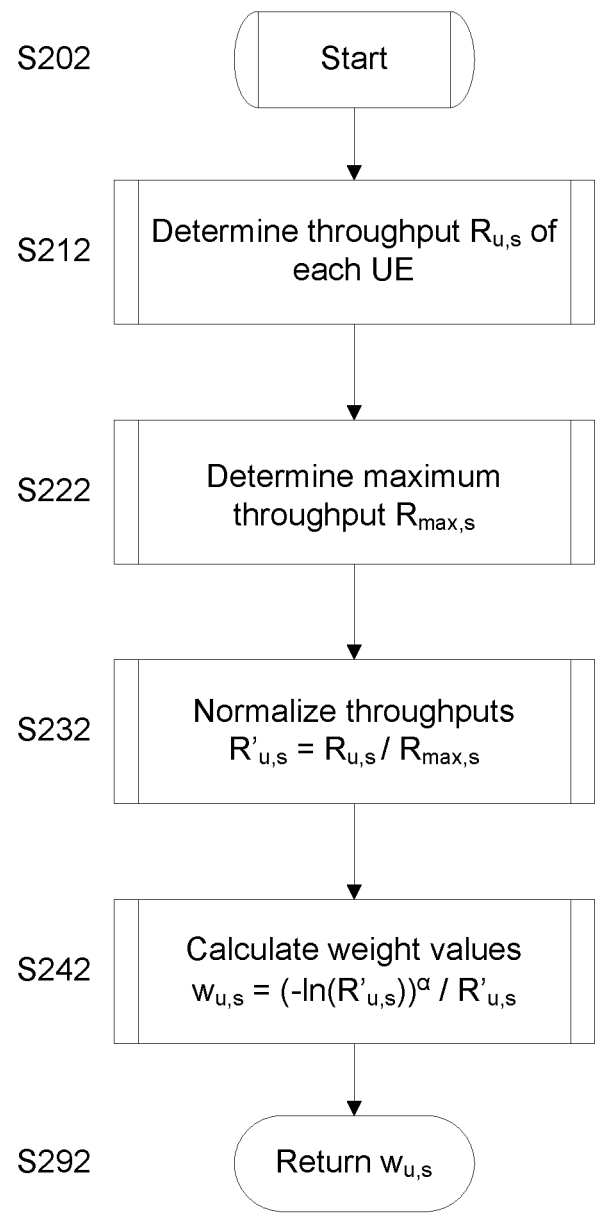
FIGS. 4 and 5 are flowcharts showing examples of determining weight values.

According to the method depicted in the flowchart of FIG. 4, after the start in step S202 the throughput $R_{u,s}$ of each user terminal is determined in step S212. Determination of this throughput may be accomplished by any suitable method, including the methods described above with reference to FIGS. 3a and 3b.

Of the determined throughput values $R_{u,s}$ for each user terminal, the maximum throughput $R_{max,s}$ is determined in step S222, and the throughputs for each user terminal are normalized in step S232 by calculating the ratio to the maximum throughput $R_{max,s}$, resulting in normalized throughputs $R'_{u,s} = R_{u,s}/R_{max,s}$.

Then, in step S242, the weight values for each user terminal are determined by calculating a logarithm, for example a natural logarithm, of said normalized throughput $R'_{u,s}$, raising the negative of said logarithm to the power of a predetermined parameter a and dividing the result by the normalized throughput $R'_{u,s}$. As a result, the weight values are given by the equation $w_{u,s} = (-\ln(R'_{u,s}))^{\alpha}/R'_{u,s}$.

Said predetermined parameter a may be a number greater, preferably much greater, than Zero, i.e. $\alpha \gg 0$. For $\alpha = 0$, this scheduling rule is the well known "proportional fair" rule. The larger $\alpha$, the smaller becomes the difference between the throughputs of the user terminals. For $\alpha \to$ infinity, it can be shown that this rule leads to equal throughputs for all users. In practice, a finite but large $\alpha$ may be used to reach the desired small difference between the user terminals' throughputs.

In general, to obtain a maximisation of the minimum throughput, and/or equalised throughputs, weight values may be defined such that the condition $$\frac{w_{u1,s}}{w_{u2,s}} \to \infty \text{ for } R'_{u1,s} < R'_{u2,s}$$

is met for all pairs u1, u2 of user terminals, and/or the condition $$dw_{u,s}/dR'_{u,s} < 0$$

is met for all user terminals.

This means that, for each pair of user terminals (receivers), the weight value of the user terminal having the higher throughput may be smaller, preferably much smaller, than the weight value of the user terminal having the lower throughput, and/or that, for all user terminals (receivers), the derivative of the weight value of a user terminal with respect to its throughput is negative.

There may be different methods resulting in weights that fulfil one or both of these conditions. One example is the above method according to which the weight values are given by the equation $w_{u,s} = (-\ln(R'_{u,s}))^{\alpha}/R'_{u,s}$. When calculating the ratio of the weights of two user terminals, $$\frac{w_{u1,s}}{w_{u2,s}} = \left(\frac{\ln(R'_{u1,s})}{\ln(R'_{u2,s})}\right)^{\alpha} \cdot \frac{R'_{u2,s}}{R'_{u1,s}}$$

$$Q := \frac{R'_{u2,s}}{R'_{u1,s}}$$

$$\frac{w_{u1,s}}{w_{u2,s}} = \left(\frac{\ln(R'_{u1,s})}{\ln(Q \cdot R'_{u1,s})}\right)^{\alpha} \cdot Q =$$

$$= \left(\frac{\ln(R'_{u1,s})}{\ln(Q) + \ln(R'_{u1,s})}\right)^{\alpha} \cdot Q =$$

$$= \left(\frac{1}{\ln(Q)/\ln(R'_{u1,s}) + 1}\right)^{\alpha} \cdot Q$$

it follows that $w_{u1,s}/w_{u2,s}$ increases with Q, i.e. with the decrease of the ratio of the respective throughputs.

Figure 5:
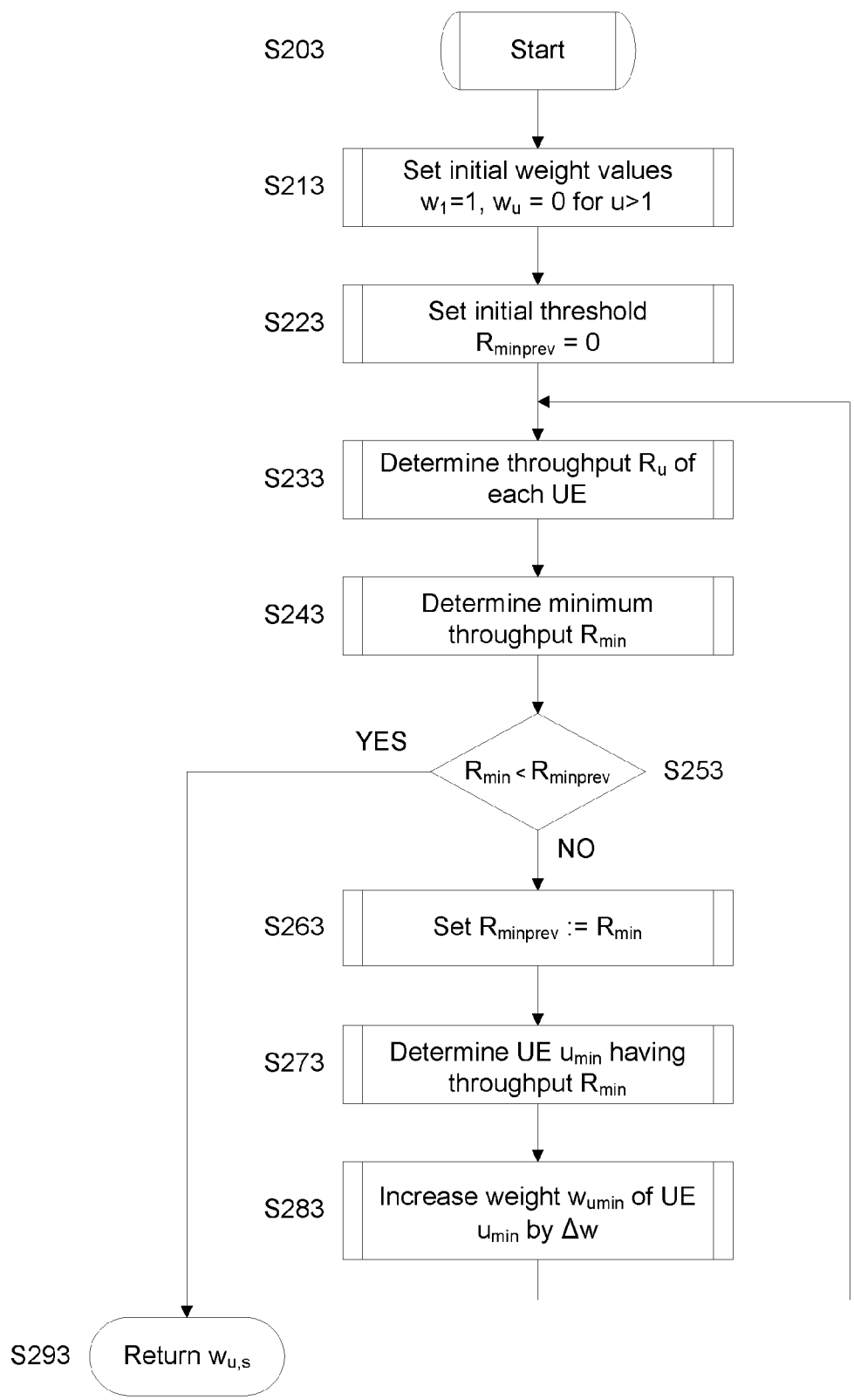

FIG. 5 shows a flowchart of a further alternative method for calculating the weight values.

After the start in step S203, in step S213 initial weight values for all user terminals are set. These initial weight values may in general be arbitrarily chosen, and in the present example weight $w_1$ of the user terminal having the least supported rate and/or the minimum throughput is set to 1, while all other weight values are set to Zero. In following step S223, an initial throughput threshold $R_{minprev}$ is set to an arbitrary value, in this example to Zero.

Subsequently, in step S233 the throughput of all user terminals is determined by any suitable method, e.g. by one of the methods described above with reference to FIG. 3, and in step S243 the minimum throughput $R_{min}$ is determined.

In step S253 a decision is taken whether the minimum throughput $R_{min}$ is smaller than the throughput threshold $R_{minprev}$, which serves as criterion of convergence for the minimum throughput $R_{min}$. If this is the case (YES in step S253), the method terminates and the current weight values $w_{u,s}$ are returned in step S293. Else (NO in step S253), the method proceeds to step S263, in which the throughput threshold $R_{minprev}$ is re-set to the found minimum throughput $R_{min}$ (which in this case is equal to or greater than the previous throughput threshold). It is obvious that for the first time after initialisation, the decision result in step S253 is in any case NO, as $R_{minprev} = 0$ and the minimum throughput must be $R_{min} \geq 0$ in this case.

In step S273, the user terminal $u_{min}$ having the minimum throughput $R_{min}$ is determined, and in step S283 the weight $w_{umin}$ of this user terminal is increased by a certain amount $\Delta w$. Then, the method loops back to step S233 and is accordingly repeatedly executed.

There are different alternatives for setting the amount $\Delta w$ by which the weight is increased, one being a fixed, predetermined amount. It is however desirable that the minimum weight is at least increased by an amount $\Delta w$ leading to a change of the minimum throughput $R_{min}$ in order to have the method converge after an appropriate number of loops. In order to determine such a minimum increase amount, it may be taken into account whether the transmit rates (the supported transmission rates $r_{u,s}$ as well as the used transmit rate $Ra_s$) are quantized, i.e. can take on only discrete values, or not. Accordingly, when the transmit rates are quantized, amount $\Delta w$ may be obtained by taking into account the discrete values of transmit rates, e.g. their quantization step(s).

If the supported rates $r_u$ are random variables with a continuous distribution and the number of resource units (e.g. transmission time intervals) taken into account is virtually infinite, then the optimal weights are found when this method terminates. For discretely distributed $r_u$ and a finite number of resource units, the method may terminate with a suboptimal weight combination, however still yielding expedient results.

Finally, the weight values as calculated with any of the above methods may be used as input values in step S20 of the method described with reference to FIG. 2, or in step S120 of the method described with reference to FIG. 6b.

It has to be mentioned that there are at least two different scenarios for adaptation of the transmit rate $Ra_s$ according to the methods of FIGS. 2, 6a and 6b and/or the weight values $w_{u,s}$ according to FIGS. 4 and 5.

First, there are scenarios where all the supported transmission rates $r_{u,s}$ are known to the scheduler simultaneously and before the actual transmission takes place over the s=1 . . . S resources. If s denotes a time resource unit then this would imply that a prediction of S units into the future is required. If s denoted a frequency resource unit or any other resource unit that is not time-based, actual and known values may be obtained. However, this would mean that the rates $Ra_s$ are set for e.g. frequency resource units separately. In this case the throughput $R_u$ may preferably be calculated using the expectation value of step ST31 in FIG. 3a or the averaging of step ST32 in FIG. 3b considering all resources s=1 . . . S.

Regardless of which type of resource is denoted by s, when returning to FIGS. 2 and 6b, in such a scenario weight values may be calculated beforehand and input for each resource unit, e.g. transmission time interval (TTI), s in step S20 resp. step S120. In such a case, also the transmit rates $Ra_s$ for each resource unit, e.g. TTI, may be calculated before actual transmission starts and stored for later use, e.g. in an accordingly adapted storage means, e.g. a database on a hard drive or in an electronic memory, of the base station BS of FIG. 1.

Second, there are scenarios where not all supported transmission rates $r_{u,s}$ of all used resource units (e.g. time steps) are known beforehand, for example in cases where adaptation of the transmit rate $Ra_s$ and/or the weight values $w_{u,s}$ takes place dynamically during transmission. Dynamic updating of the transmit rate $Ra_s$ may be preferred in situations where the supported transmission rates $r_{u,s}$ vary over time, e.g. in mobile telecommunications due to movement of user terminals and/or variations of load in a cell or its neighboring cell(s).

In such a case, a calculation or recalculation of the weight values $w_{u,s}$ may take place at every time step or only at certain time steps, e.g. when transmission conditions have changed. Particularly, the weight values $w_{u,s}$ may be calculated before the start of transmission or in the first time step, and recalculated or updated at every subsequent time step or only at certain time steps. It is also conceivable that the loop of the method of FIG. 2 or FIG. 6b is overlayed with the according loop of the method of FIG. 5, wherein subsequent to step S283 of FIG. 5 the method proceeds to step S30 of FIG. 2 resp. step S130 of FIG. 6b, and subsequent to step S10 in the next cycle of the method of FIG. 2 resp. subsequent to step S110 in the next cycle of the method of FIG. 6b, the method proceeds to step S233 of FIG. 5.

In any case, it may be that the supported transmission rates $r_{u,s}$ of the receivers (user terminals UE) and/or the transmit rate $Ra_s$ to be set by the transmitter (base station BS) can take on only discrete values, for example when the number of configurable transmission rates is limited. The quantization steps in the $r_{u,s}$ and/or $Ra_s$ can be used to determine the minimum changes necessary when updating the weight values $w_{u,s}$.

It has to be kept in mind that, when transmitting a multicast message in an error-prone environment such as radio or mobile communications, usage of a redundant code like e.g. an erasure code such as the raptor code at the application layer is preferable. This enables a user terminal to reconstruct the complete message even when not all data packets could be received and/or successfully decoded.

Accordingly, there are different methods of adaptation of the transmit rates $Ra_s$. At first, the effective transmission rate on the physical layer may be adapted, e.g.

by adapting the coding and/or modulation scheme in a radio transmission, for example using different QAM (Quadrature Amplitude Modulation) stages. Further, also the transmission rate on the application layer may be adapted, e.g. when using an aforementioned erasure code. In such a case, a certain length or redundancy level may be set by the beginning of a transmission, particularly when the transmit rates $Ra_s$ are calculated completely prior to transmission. But even if the transmit rates $Ra_s$ are updated dynamically, it may be started with a rather short code (having a low redundancy level) and append code elements (increase redundancy) according to actual needs determined during transmission.

Figure 7A:
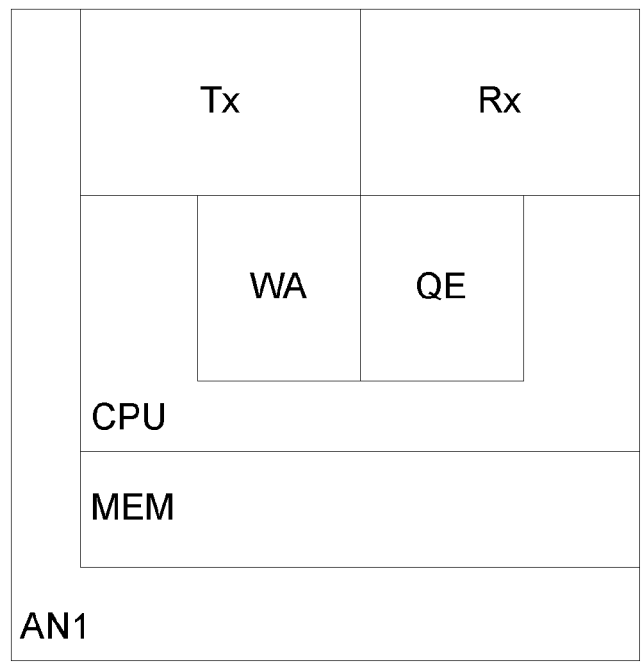
FIGS. 7a and 7b show schematic block diagrams of network access nodes.
Figure 7B:
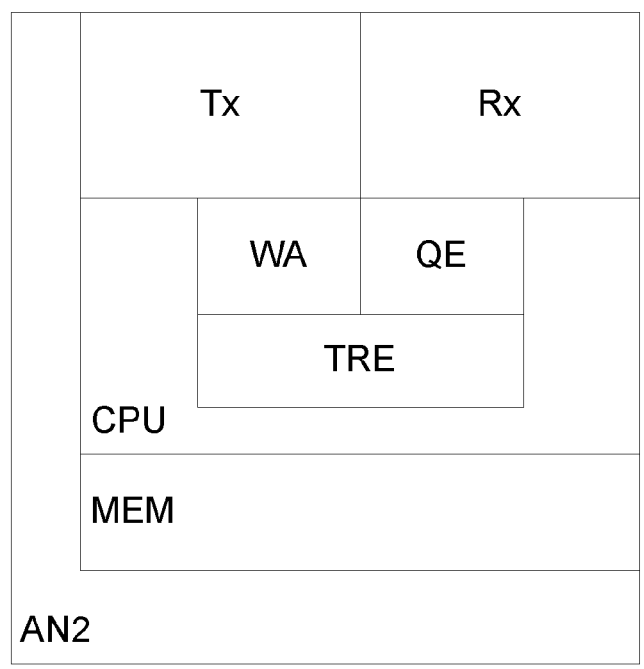

FIGS. 7a and 7b show schematic block diagrams of network access nodes AN1 and AN2, which may be constituted by or be comprised in the base station BS of FIG. 1. Said network access nodes AN1 and AN2 comprise a transmitter Tx being adapted to send multicast data to a plurality of receivers, e.g. the user terminals $UE_1 \ldots UE_N$ of FIG. 1, and being adapted to transmit at different transmit rates $Ra_s$, e.g. for different transmission resource units like transmission time intervals. For sending said data, transmitter Tx may comprise or be connected to an antenna, not shown, like antenna $A_1$ depicted in FIG. 1. Optionally, network access nodes AN1 and AN2 may also comprise a receiver Rx adapted to receive channel quality information from the plurality of receivers. Said receiver Rx may be connected to an antenna, not shown, e.g. the antenna of transmitter Tx or to a dedicated antenna, or may comprise such an antenna.

Network access nodes AN1 and AN2 further comprise a quality estimator QE for determining channel quality of the receivers, e.g. calculating the channel quality measures as described above. This may be accomplished by using channel quality information received via receiver Rx. Said quality estimator QE may be part of a processor CPU being comprised in network access nodes AN1 and AN2, or may be part of a dedicated processor. The quality estimator QE may, at least partly, be implemented in software to be executed on the processor CPU or on a dedicated processor.

Network access nodes AN1 and AN2 further comprise a weight adaptor WA for calculating and assigning weight values and/or cumulative weight values according to the method described above. Said weight adaptor WA may be part of a processor CPU of network access node AN, and may, at least partly, be implemented in software to be executed on the processor CPU.

Said processor CPU being comprised in network access nodes AN1 and AN2 may be a standard processing unit like a general microprocessor or a signal processor being adapted to perform calculation of the weight values, cumulative weight values and/or channel quality measures.

Network access nodes AN1 and AN2 may further comprise a memory MEM for storing weight values and/or cumulative weight values as well as other parameters like calculated channel quality measures, adapted transmit rates etc. according to the above methods. Memory MEM may further be adapted to store software used in quality estimator QE and/or weight adaptor WA. It is, however, conceivable that different memories for storing different types of data are provided, and/or that external memory devices are used for this purpose.

Particularly for storing parameters and values used in the above-described method, like weight values, cumulative weight values, channel quality measures etc., there may be provided a database which may be stored on memory MEM.

Network access node AN2 of FIG. 7b further comprises a transmission rate estimation unit TRE being adapted to determine effective rates of at least two receivers, calculate a combined function of effective rates of the at least two receivers and determine the argument of a maximum of said combined function. This transmission rate estimation unit TRE may again be part of processor CPU being comprised in network access node AN2, or may be part of a dedicated processor, and may, at least partly, be implemented in software to be executed on the processor CPU or on a dedicated processor.

It is to be noted that network access node AN2 of FIG. 7b does not necessarily need to comprise weight adaptor WA and quality estimator QE, however it might be advantageous.

Based on the foregoing, network access nodes AN1 and AN2 as depicted in FIGS. 7a and 7b are adapted to perform the methods as described above, for AN1 particularly the method described with reference to FIG. 2, and for AN2 particularly the methods described with reference to FIGS. 6a and 6b.

It will be shown in the following that with the above methods at least in some cases optimal or near to optimal results are achieved, and the improvements achieved in comparison with other known methods will be demonstrated based on simulations.

It is assumed that the method is performed generally as described with reference to FIG. 2, wherein the cumulative weight values $wc_{u,s}$ for each user terminal are calculated as the sum of the weight values $w_{u,s}$ of the user terminals having a higher supported rate $r_{u,s}$, and wherein the weighted channel quality measure $wr_{u,s}$ of each user terminal is the product of the cumulative weight value $wc_{u,s}$ and its supported rate $r_{u,s}$.

In the following exemplary proofs are outlined where the rate selection method according to FIG. 2 is optimal. For the proof it is assumed that the effective rate $rs_{u,s}$ of a user terminal given the selected transmit rate $Ra_s$ is equal to the selected transmit rate if $Ra_s$ is smaller than $r_{u,s}$ (i.e. the respective UE is scheduled in this TTI) and equals Zero if $Ra_s$ is greater than $r_{u,s}$ (i.e. the respective UE is not scheduled in this TTI), according to the method of calculating throughputs of FIG. 3.

For the iid case it is recognized that the optimal algorithm equalises all user terminals throughputs $R_{u,s}$. The reason is that in the case of unequal throughputs, it is always possible to increase the weight $w_{u,s}$ of the user terminal with the smallest throughput, which means this user terminal gets scheduled more often, increasing this user terminals throughput. In general, this requires that the transmit rate is decreased for some combinations of $r_{u,s}$, thus decreasing the throughput of some other users. Thereby all throughputs can be equalised. Therefore the goal of maximising the minimum throughput is equivalent to the goal of maximising the sum of the throughputs of all users.

As the supported rates $r_{u,s}$ of all users are identically and independently distributed, the weights for all users were set to the same value $w_0$. As all weights may be scaled by the same factor without changing the throughputs $R_{u,s}$ according to the algorithms of FIGS. 3a and 3b, $w_0$ can be set to 1 without loss of generality. Therefore, the calculation of the cumulative weight values $wc_{u,s}$ simplifies to determining the number of user terminals having a higher supported rate, namely $$wc_{u,s} = \sum_{u_i \in U_u} 1 = |U_{u,s}|$$

$$U_{u,s}: \{u_i | r_{u_i,s} \geq r_u\}$$

where $|U_{u,s}|$ is the size of the set $U_{u,s}$. As a consequence, in each TTI the transmit rate $Ra_s$ is set such that the sum of the effective rates $$Rs_s = \sum_u rs_{u,s} = r_{u,s} \cdot |U_{u,s}|$$

over all UEs is maximised, i.e.:

$$u_{0,s} = \underset{u}{\operatorname{argmax}}(r_{u,s} \cdot |U_{u,s}|)$$

This in turn maximises the sum throughput over all TTIs. Thereby it is shown that this algorithm maximises the multicast throughput in the iid case.

For the non-iid case the optimal algorithm still has to equalise all user terminal throughputs $R_{u,s}$, i.e. the goal is consistent with the iid case. The optimal weights $w_{u,s}$ in the non-iid case are, however, in general not all equal.

An exemplary proof for this case is conducted for two user terminals. Assume the weights are initially set to values such that $\min(R_1,R_2)$ is maximised, i.e. that achieve $R_{tot,0}:=R_1=R_2$.

Consider rate pair $k_1$ for which $r_{1,k1} > r_{2,k1}$ and $r_{1,k1} \cdot w_1 > r_{2,k1} \cdot (w_1+w_2)$, so according to the above rate selection rule, $r_{1,k1}$ is selected. Assume instead $r_{2,k1}$ is selected. Then the throughputs $R_1$ and $R_2$ change by $dR_{1,k1} = r_{2,k1}$) and $dR_{2,ki = r2,k1}$, i.e. $R_1$ decreases and $R_2$ increases. As the multicast throughput is defined as $R_{tot} = \min(R_1,R_2)$, $R_{tot}$ decreases by this suboptimal rate selection. Next it needs to be checked whether $R_1$ can be increased again without decreasing $R_2$ below its original value $R_{tot,0}$.

Assume for another rate combination $k_2$ we have $r_{1,k2} > r_{2,k2}$ and $r_{1,k2} \cdot w_1 < r_{2,k2} \cdot (w_1+w_2)$, so according to the above rate selection rule the rate $r_{2,k2}$ is selected for transmission. In this case both user terminals can decode. Assume instead $r_{1,k2}$ is selected, in order to increase $R_1$ again. This implies a change in the throughputs by $dR_{1,k2} = (r_{1,k2} - r_{2,k2})$ and $dR_{2,k2} = -r_{2,k2}$, now requiring $dR_{2,k1} + dR_{2,k2} > 0$, i.e. that $R_2$ does not decrease after both rate switches are performed.

Rewriting the equations above:

$$r_{2,k1} \geq r_{2,k2}$$

$$r_{1,k1} - r_{2,k1} > r_{2,k1} + r_{2,k1} \cdot w_2/w_1 - r_{2,k1} = r_{2,k1} \cdot w_2/w_1$$

$$r_{1,k2} - r_{2,k2} > r_{2,k2} + r_{2,k2} \cdot w_2/w_1 - r_{2,k2} = r_{2,k2} \cdot w_2/w_1$$

i.e.:

$$r_{1,k2} - r_{2,k2} < r_{1,k1} - r2,k1$$

$$dR_{1,k2} < -dR_{1,k1}$$

$$dR_{1,k2} + dR_{1,kl} < 0$$

i.e. $R_1$ decreases by the double-switch.

The other rate relation to be considered for combination $k_2$ is $r_{1,k2} < r_{2,k2}$ and $r_{1,k2} \cdot (w_1+w_2) < r_{2,k2} \cdot w_2$. Before the switching the assumption $R_1 = R_2$ implies that $r_{1,kl} = r_{2,k2}$. After the switching, if $R_{tot}$ shall increase, then all new throughputs are required to be larger than the throughputs before the reselection:

Throughput for $UE_1$:

$$r_{2,k1} + r_{1,k2} > r_1, k_1$$

Throughput for $UE_2$:

$$r_{2,k1} + r_{1,k2} > r_{2,k2}$$

The left hand side of these equations can be rewritten as:

$$r_{2,k1} + r_{1,k2} < r_{1,k1} \cdot w_1/(w_1+w_2) + r_{1,k2} < r_{1,k1} w_1/(w_1+w_2) + r_{2,k2} \cdot w_2/(w_1+w_2) = r_{1,k1} \cdot (w_1+w_2)/(w_1+w_2) = r_{1,k1}$$

This proves that the above inequalities describing the throughputs for $UE_1$ and $UE_2$ are infeasible.

Consequently it is not possible to deviate from the above rate selection rule without decreasing the throughput of one of the two user terminals. This completes the proof that rate reselection involving two user terminals does not improve the multicast throughput.

In a similar way, this proof may also be conducted for three or more user terminals, however in these cases a high number of combinations will have to be investigated. E.g. for the case of three user terminals it has to be proven that not all throughputs $R_1$, $R_2$ and $R_3$ can increase by reselecting the transmit rates for at least 3 combinations of $r_1$, $r_2$ and $r_3$.

In the following, the results of simulations are presented, in which the proposed method has been compared with the method known from the WO 2008/079222 A1 (in the following denoted as "Kozat method") and with the method where the rate in each time slot s is set equal to the lowest rate $r_{u,s}$ of all user terminals u ("worst UE method").

Figure 8:
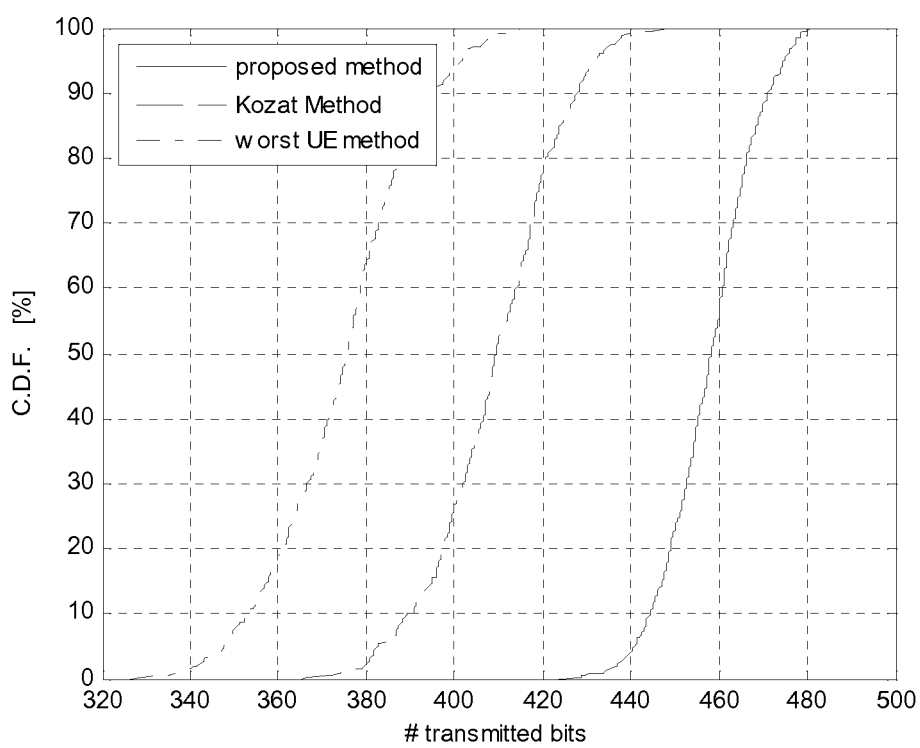
FIG. 8 shows simulation results for iid exponentially distributed SNR.

FIG. 8 shows the simulation results for a scenario with iid exponentially distributed SNR (Signal-to-Noise Ratio). Random SNR values were generated for $N_u=5$ users and $N_s=100$ slots. The SNR is exponentially distributed, modelling the well known Rayleigh fading property of radio propagation under multipath reflection. The mean SINR (Signal to Interference and Noise Ratio) is 20 dB. One such SNR matrix of $N_u$ rows and $N_s$ columns is called a snapshot. 500 snapshots are considered with independent SNR matrices. The SNR values are mapped to rate values $r_{u,s}$, assuming BLEP=0.01. The rates are in FIG. 8 expressed as the number of bits that can be transmitted in a single "chunk", i.e. a basic time-frequency resource block.

From FIG. 8 it can be seen that in this scenario the proposed method achieves a significant throughput improvement over both reference methods. The gain in the mean throughput compared to the Kozat method is 12% and compared to the worst UE method it is 22%.

For radio networks, however, the iid SNRs are not realistic, because in addition to the Rayleigh fading also the shadowing of the radio path due to obstacles and the signal attenuation depending on the distance of the user terminal to the base station are further random variables that need to be taken into account. Furthermore, the intercell interference matters.

Therefore a radio network simulation has been performed using a dedicated multi-cell radio network simulator comprising models and algorithms according to the 3GPP LTE (Long Term Evolution) standard in order to obtain more realistic SINR (Signal to Interference and Noise Ratio) values. The most relevant simulation parameters are listed in the following Table 1.

TABLE 1

Radio Network Simulation Assumptions

| parameter/model | value/description |
|---|---|
| inter-site distance | 500 m |
| propagation model | SCM urban macro; 15° angular spread |
| # chunks simultaneously scheduled | 5 |
| transmit power per chunk | 20 W/25 * 5 = 4 W |
| # transmit streams | 1 |
| traffic model | full buffer, no other traffic than the single multicast group per BS. |
| code rate granularity | 0.01 |
| target BLEP | 0.01 |

In total the SINR of 1050 randomly positioned user terminals has been calculated. In the scheduling performance simulations a user group was selected randomly from the 1050 user terminals. For each investigated group size, such a random choice is called a snapshot and 500 snapshots were simulated.

Figure 9A:
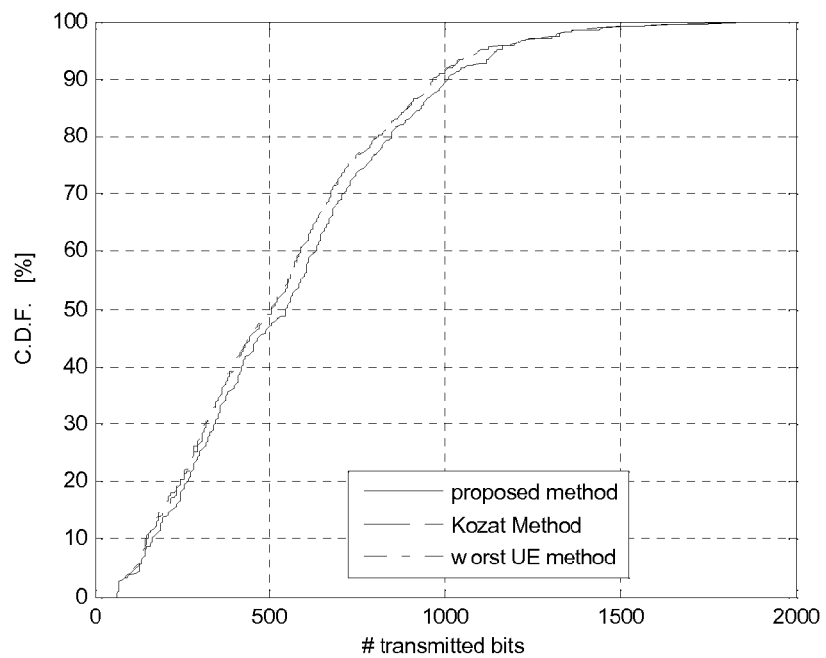
FIGS. 9a and 9b show simulation results for non-iid distributed SNR without macro mobility.
Figure 9B:
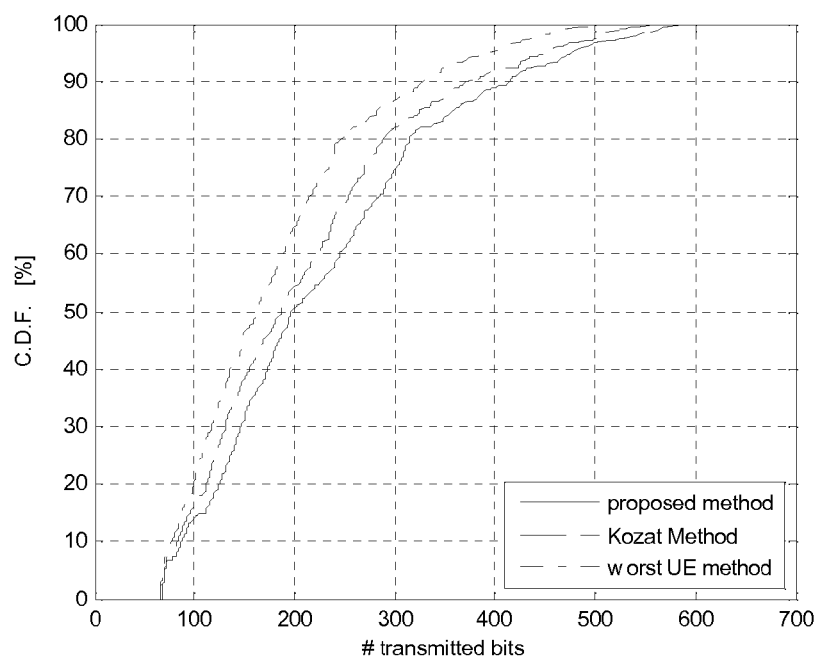

In the first radio network simulation scenario the user terminals (UEs) moved at a speed of only 3 km/h (no macro mobility), therefore the shadowing is constant for each UE, only the Rayleigh fading changes between slots. FIGS. 9a and 9b show the results for 5 user terminals per group (FIGS. 9a) and 20 user terminals per group (FIG. 9b), again together with the reference methods, Kozat method and worst UE method. Table 2 shows the gains in average throughput for the cases 2, 5, 10 and 20 user terminals (UEs) per group, from which the results of the cases with 5 and 20 user terminals per group are depicted in FIGS. 9a and 9b, respectively. Note that the number of transmitted bits is much larger than in the previous scenario, because now 5 times the radio resources are assumed to be available in each scheduling interval (see Table 1).

TABLE 2

Gains of the proposed method by number of UEs per group, no macro mobility

| number of UEs per group | 2 | 5 | 10 | 20 |
|---|---|---|---|---|
| gain vs Kozat scheduling [%] | 1 | 5 | 8 | 9 |
| gain vs worst UE scheduling [%] | 1 | 6 | 13 | 24 |

The gains of the proposed method are smaller in this scenario. The same holds for the gain achieved by Kozat's method compared to the worst UE method. The reason is that the variance in the per-slot rate of each UE is low compared to the difference in the mean rates of a pair of UEs. Therefore, in most of the slots the UE with the lowest rate is the same UE, so setting the transmit rate equal to this UE's rate is already close to optimal.

The reason for the low variance of the per slot rate and the large variance of the mean UE rates is that for the slot-variance the Rayleigh fading is responsible and due to transmission over 5 chunks the fading is averaged out already to some extent. The variance of the mean UE rates is caused by the differences in the distance from the UEs to their BS and the propagation shadowing process, which can cause variations of several 10 dB.

The second radio network simulation scenario assumes that UEs move a greater distance during the transmission time of the code block, such that also the shadowing varies over time. In order to consider a scenario where this shadowing variation contributes as much as possible to the gain of the proposed multicast scheduling, it has been assumed that the shadowing sequence for each UE is an uncorrelated random process following the generally assumed log-normal distribution. A standard deviation of 6 dB is assumed.

Figure 10A:
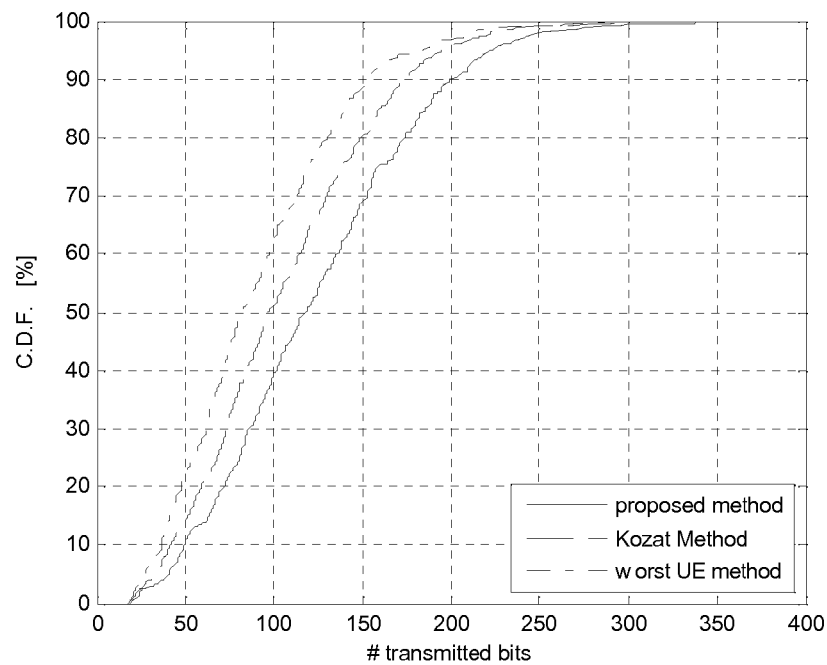
FIGS. 10a and 10b show simulation results for non-iid distributed SNR with macro mobility.
Figure 10B:
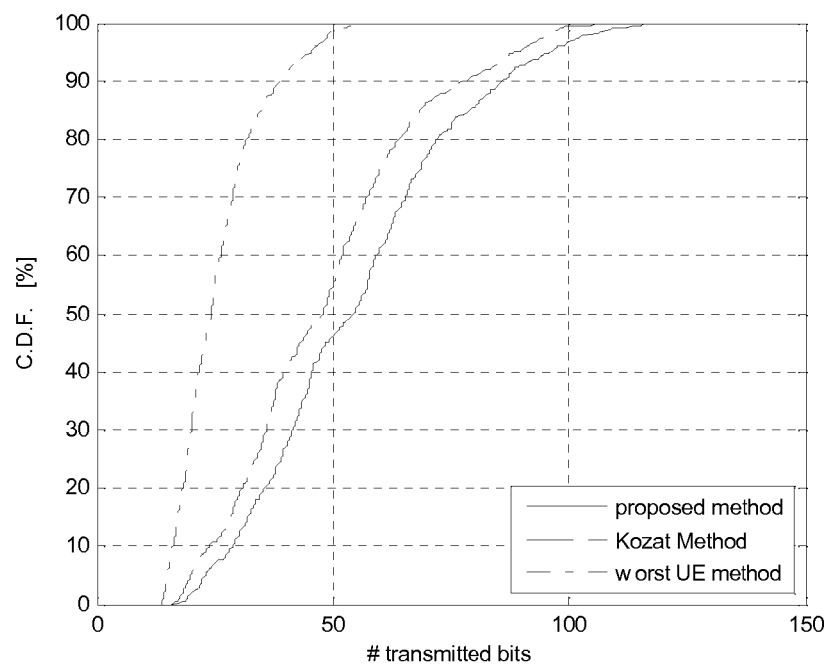

FIGS. 10a and 10b show the results for 5 and 20 user terminals per group, respectively, again together with the 2 reference methods Kozat and worst UE. Table 3 shows the gains in average throughput. In this scenario the proposed method achieves a gain of 17% for a group size of 5 UEs and 13% for 20 UEs compared to the Kozat method, which in turn is also performing remarkably better than the worst UE method.

TABLE 3

Gains of the proposed method by number of UEs per group, with macro mobility

| number of UEs per group | 2 | 5 | 10 | 20 |
|---|---|---|---|---|
| gain vs Kozat scheduling [%] | 7 | 17 | 16 | 13 |
| gain vs worst UE scheduling [%] | 7 | 35 | 71 | 113 |

It can be seen that the method as described herein is capable of improving the overall throughput of a multicast transmission as compared with other known methods. As is apparent from the shown simulation results, the improvements are particularly striking for the iid scenario and for a non-iid scenario with macro mobility. Reason for the latter is that the method takes advantage of changing channel qualities among the user terminals, and is capable of equalizing their throughputs on a high level.

With the above, different methods for determining adaptations of transmit rates for a multicast transmission have been provided, taking into account many considerations like different levels of knowledge on the transmission channel and different assumptions that can be made. Some steps of the methods presented herein can be performed in alternative ways, and of course different alternatives of different steps may be combined if deemed appropriate. From the teachings presented herein, a person skilled in the art will be able to select appropriate measures for the actual application, Clearly, several modifications will be apparent to and can be readily made by the skilled in the art without departing from the scope of the present invention. Therefore, the scope of the claims shall not be limited by the illustrations or the embodiments given in the description in the form of examples, but rather the claims shall encompass all of the features residing in the present invention, including all the features that would be treated as equivalents by the skilled in the art.

It is further understood that multicasting as defined herein may also comprise factual broadcasting scenarios, e.g. when a message is sent to all user terminals currently being in a certain mobile communication cell. The only precondition is that the transmitter has any possibility of determining channel quality measures and/or effective rates of at least some intended receivers.

The invention claimed is:

1. A method for transmitting multicast information from at least one transmitter to a plurality of receivers, comprising:
   determining a channel quality measure for each of at least two receivers;
   determining, for the at least two receivers, effective rates as a function of a transmission rate to be set by the transmitter and based on the channel quality measures;
   assigning a weight value to each of the at least two receivers;
   calculating a combined function of effective rates of the at least two receivers as a weighted sum of the effective rates;
   determining an argument of a maximum of the combined function;
   setting the transmission rate of the receiver to the argument;
   wherein the determining effective rates, calculating a combined function of effective rates, determining an argument, and setting, are performed in a network access node of a wireless network.

2. The method of claim 1, wherein the channel quality measure comprises a supported transmission rate.

3. The method of claim 1, wherein the determining effective rates, calculating a combined function of effective rates; determining an argument, and setting are performed for each transmission resource unit.

4. A method for transmitting multicast information from at least one transmitter to a plurality of receivers, comprising:
   determining a channel quality measure for each of the plurality of receivers;
   assigning a weight value to at least one receiver and a cumulative weight value to each receiver out of the plurality of receivers such that a minimum of throughputs of the plurality of receivers is maximized; wherein at least for a subset out of the plurality of receivers the cumulative weight value is a function calculated based on weight values of at least one other receiver out of the plurality of receivers;
   calculating, for each receiver, a weighted channel quality measure that is a function of the respective cumulative weight value, and the respective channel quality measure, of the receiver;
   adapting a transmission rate of the transmitter to meet the channel quality of the receiver having the maximum weighted channel quality measure.

5. The method of claim 4, wherein the cumulative weight value of each receiver is calculated based on weight values of all receivers having a better channel quality.

6. The method of claim 5, wherein the cumulative weight value of each receiver is the sum of the weight values of all receivers having a better channel quality.

7. The method of claim 4, wherein the channel quality measure comprises a supported transmission rate.

8. The method of claim 7, wherein the weighted channel quality measure is calculated by multiplying the supported transmission rate with the cumulative weight value.

9. The method of claim 4, wherein the transmission rate of the transmitter is set to cause the transmitter to transmit at different rates for different transmission resource units.

10. The method of claim 9, wherein the transmission resource units are time units.

11. The method of claim 10, wherein the time units are transmission time intervals.

12. The method of claim 4, wherein the assigning a weight value to at least one receiver comprises assigning a weight value to each receiver out of the plurality of receivers.

13. The method of claim 4, further comprising calculating throughputs by averaging over several transmission resource units.

14. The method of claim 4, wherein the assigning a weight value to at least one receiver and a cumulative weight value to each receiver out of the plurality of receivers comprises assigning a weight value to at least one receiver and a cumulative weight value to each receiver out of the plurality of receivers such that the minimum expectation value of throughputs of the plurality of receivers is maximized.

15. The method of claim 14, wherein the transmission rate is adapted such as to comply with a proportional fair rule.

16. The method of claim 13, wherein the weight value of a receiver is set inversely to the throughput of the receiver.

17. The method of claim 13, wherein the weight values are set such that at least one of the following conditions is met:
   for each pair of receivers, the weight value of the receiver having the higher throughput is smaller than the weight value of the receiver having the lower throughput; and
   for all receivers, the derivative of the weight value of a receiver with respect to throughput of the receiver is negative.

18. The method of claim 15, wherein the ratio of the weight value of the receiver having the higher throughput and the weight value of the receiver having the lower throughput is a function of the ratio of the lower throughput and the higher throughput.

19. The method of claim 13, further comprising calculating the weight values by:
   calculating, for each receiver, a relation of the throughput of the receiver to the maximum throughput of all receivers;
   calculating, for each receiver, a logarithm of the relation;
   raising the negative of the logarithm to the power of a predetermined parameter;

dividing the resulting value by the relation of the throughput of the receiver to the maximum throughput of all receivers.

20. The method of claim 17, wherein the predetermined parameter is set to be a number much larger than zero.

21. The method of claim 4, wherein calculation of the weight values comprises the steps of:
   a) setting all weight values to predetermined initial values;
   b) determining a throughput for each receiver;
   c) determining the minimum throughput of all receivers;
   d) increasing the weight value of the receiver having the minimum throughput;
   f) repeating steps b to d until the minimum throughput converges.

22. The method of claim 4, wherein the determining, assigning, calculating, and adapting are performed for each transmission resource unit.

23. The method of claim 4, wherein the determining, assigning, calculating, and adapting are performed in a network access node of a wireless network.

24. A network access node, comprising:
one or more processing circuits configured to:
   transmit multicast information to a plurality of receivers, the transmitter configured to be able to transmit at different transmission rates;
   determine a channel quality measure for each of the plurality of receivers;
   assign a weight value to at least one receiver and a cumulative weight value to each receiver out of the plurality of receivers such that a minimum of throughputs of the plurality of receivers is maximized; wherein at least for a subset out of the plurality of receivers the cumulative weight value is a function calculated based on weight values of at least one other receiver out of the plurality of receivers;
   calculate, for each receiver, a weighted channel quality measure that is a function of the respective cumulative weight value, and the respective channel quality measure, of the receiver;
   adapt a transmission rate of the transmitter to meet the channel quality of the receiver having the maximum weighted channel quality measure.

25. The network access node of claim 24, wherein the network access node is an access node to a wireless network.

26. The network access node of claim 24, wherein the one or more processing circuits are further configured to:
   receive channel quality information from the plurality of receivers;
   determine the channel quality measure from the received channel quality information.

27. A network access node, comprising:
one or more processing circuits configured to:
   transmit multicast information to a plurality of receivers, the transmitter being able to transmit at different transmission rates;
   determine a channel quality measure for each of at least two receivers;
      determine effective rates of the at least two receivers as a function of a transmission rate to be set by the transmitter and based on the channel quality measures;
   assign a weight value to each of the at least two receivers;
   calculate a combined function of effective rates of the at least two receivers as a weighted sum of the effective rates;
   determine an argument of a maximum of the combined function;
   set the transmission rate of the receiver to the argument;
wherein the network access node is an access node to a wireless network.

28. A network access node, comprising:
one or more processing circuits configured to:
   transmit multicast information to a plurality of receivers, the transmitter transmitting at different transmission rates for different transmission resource units;
   determine effective rates of at least two receivers, calculate a combined function of effective rates of the at least two receivers and determine the argument of a maximum of the combined function;
   determine a channel quality measure for each of the plurality of receivers;
   assign a weight value to at least one receiver and a cumulative weight value to each receiver out of the plurality of receivers; wherein at least for a subset out of the plurality of receivers the cumulative weight value is a function calculated based on weight values of at least one other receiver out of the plurality of receivers;
   calculate, for each receiver, a weighted channel quality measure that is a function of the respective cumulative weight value, and the respective channel quality measure, of the receiver;
   adapt a transmission rate of the transmitter to meet the channel quality of the receiver having the maximum weighted channel quality measure.

29. The network access node of claim 28, wherein the one or more processing circuits are further configured to assign a weight value to each of the at least two receivers.

30. The network access node of claim 28, wherein the one or more processing circuits are further configured to determine a channel quality measure for each of the at least two receivers.

31. The network access node of claim 28, wherein the network access node is an access node to a wireless network.

* * * * *

UNITED STATES PATENT AND TRADEMARK OFFICE
CERTIFICATE OF CORRECTION

PATENT NO. : 8,811,211 B2
APPLICATION NO. : 13/388844
DATED : August 19, 2014
INVENTOR(S) : Huschke et al.

It is certified that error appears in the above-identified patent and that said Letters Patent is hereby corrected as shown below:

On the Title Page, Item (57), under "ABSTRACT", in Column 2, Line 4, delete "($S_{10}$)" and insert -- (S10) --, therefor.

On the Title Page, in the illustrative figure, delete "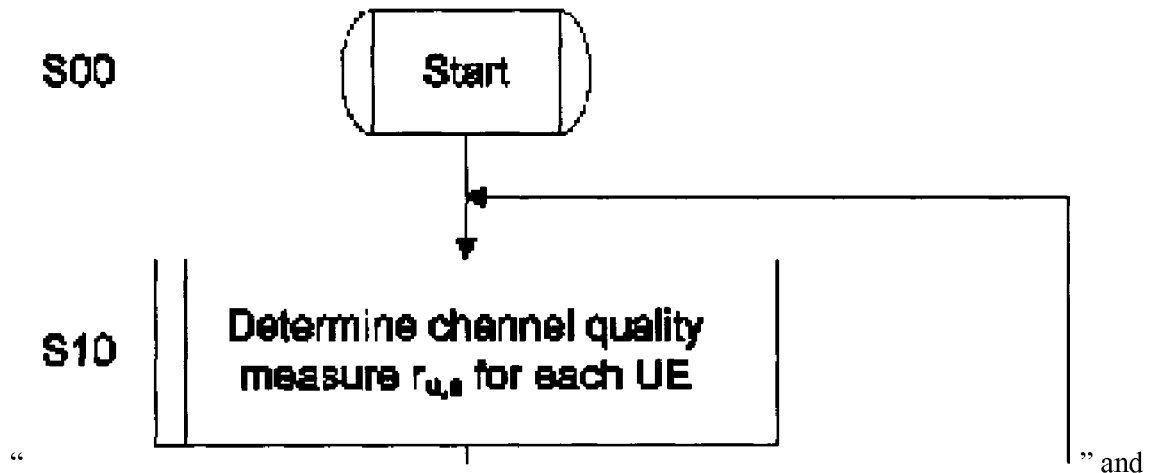" and

Signed and Sealed this
Tenth Day of November, 2015

Michelle K. Lee
*Director of the United States Patent and Trademark Office* insert

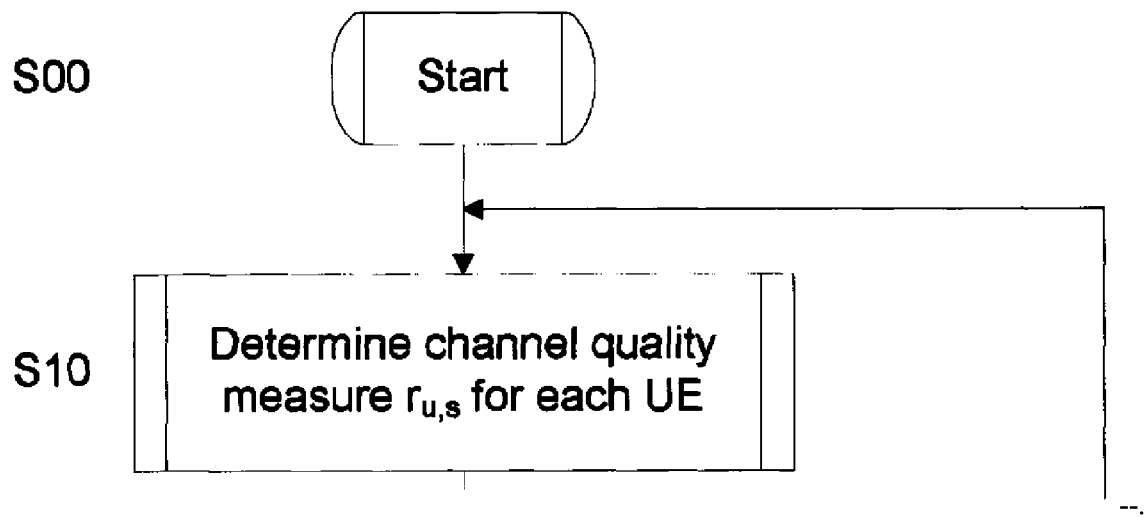

--.

In the Specification

In Column 2, Line 41, delete "$r_{u,s}$and" and insert -- $r_{u,s}$ and --, therefor.

In Column 7, Line 52, delete "$r_{u0,s}$of" and insert -- $r_{u0,s}$ of --, therefor.

In Column 8, Line 45, delete "terminals" and insert -- terminals. --, therefor.

In Column 15, Lines 56-67, delete "by adapting the coding............. needs determined during transmission." and insert the same at Line 55, after "e.g.", as a continuation paragraph.

In Column 21, Line 14, delete "application," and insert -- application. --, therefor.

In the Claims

In Column 22, Line 55, in Claim 18, delete "15," and insert -- 17, --, therefor.

In Column 23, Line 4, in Claim 20, delete "17," and insert -- 19, --, therefor.